(12) United States Patent
Posselt et al.

(10) Patent No.: US 11,469,791 B2
(45) Date of Patent: Oct. 11, 2022

(54) CASCADE OF FILTERS AND A METHOD FOR FILTERING AN ANALOG RADIO-FREQUENCY INPUT SIGNAL

(71) Applicants: Bayerische Motoren Werke Aktiengesellschaft, Munich (DE); Analog Devices Inc., Norwood, MA (US)

(72) Inventors: Adrian Posselt, Munich (DE); Christian Boehm, Rattenberg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 680 days.

(21) Appl. No.: 16/076,002

(22) PCT Filed: Feb. 8, 2017

(86) PCT No.: PCT/IB2017/050664
§ 371 (c)(1),
(2) Date: Aug. 7, 2018

(87) PCT Pub. No.: WO2017/137891
PCT Pub. Date: Aug. 17, 2017

(65) Prior Publication Data
US 2021/0083716 A1   Mar. 18, 2021

(30) Foreign Application Priority Data
Feb. 8, 2016 (EP) ..................................... 16154676

(51) Int. Cl.
*H04B 1/525* (2015.01)
*H04B 1/04* (2006.01)
(Continued)

(52) U.S. Cl.
CPC ............ *H04B 1/525* (2013.01); *H04B 1/0475* (2013.01); *H04B 1/1018* (2013.01); *H04B 7/0894* (2013.01)

(58) Field of Classification Search
CPC ...... H04B 1/0475; H04B 1/28; H04B 1/1638; H04B 2210/006; H04B 1/0032
(Continued)

(56) References Cited

U.S. PATENT DOCUMENTS

2002/0032788 A1   3/2002   Emanuel et al.
2007/0254592 A1*  11/2007  McCallister ......... H04B 1/0475
                                                    455/67.11
(Continued)

FOREIGN PATENT DOCUMENTS

| EP | 2254195 A1 | 11/2010 |
| EP | 2498332 A1 | 9/2012 |
| WO | 2013095386 A1 | 6/2013 |

OTHER PUBLICATIONS

Analog Devices: "1.5 GHz to 2.4 GHz RF Vector Modulator", Data Sheet AD8341; 2004-2012 Analog Devices, Inc., www.analog.com.

*Primary Examiner* — Ajibola A Akinyemi
(74) *Attorney, Agent, or Firm* — 2SPL Patent Attorneys PartG mbB; Kieran O'Leary

(57) ABSTRACT

A cascade comprising multiple filters according to an embodiment comprises a filter, which includes a splitter configured to split an analog radio-frequency input signal into at least a first signal and a second signal, a first signal path configured to generate, based on the first signal, a time-delayed signal delayed by a predetermined delay time in the time domain, a second signal path configured to generate, based on the second signal, a phase-shifted signal shifted by a controllable predetermined phase shift in the phase domain, and a coupler configured to generate an output signal based on the time-delayed signal and the
(Continued)

phase-shifted signal. Using an embodiment may improve a trade-off between frequency-related flexibility and frequency agility of a receiver infrastructure.

14 Claims, 16 Drawing Sheets

(51) Int. Cl.
    *H04B 1/10*     (2006.01)
    *H04B 7/08*     (2006.01)

(58) Field of Classification Search
    USPC .......................................................... 455/296
    See application file for complete search history.

(56) References Cited

U.S. PATENT DOCUMENTS

| | | |
|---|---|---|
| 2010/0244943 A1 | 9/2010 | Hahn et al. |
| 2015/0288413 A1 | 10/2015 | Vosburgh et al. |
| 2016/0329926 A1* | 11/2016 | Vosburgh ............. H04B 7/0894 |

* cited by examiner

CASCADE OF FILTERS AND A METHOD FOR FILTERING AN ANALOG RADIO-FREQUENCY INPUT SIGNAL

FIELD

Embodiments relate to a cascade of filters and a method for filtering an analog radio-frequency input signal.

BACKGROUND

In many fields of technology components of a system or systems communicate with one another wirelessly. Systems may also communicate wirelessly with an outside entity such as a centralized control entity, maintenance entity or the like. Using a wireless communication technology over a wire-bound communication technology may be beneficial for instance in the case of a mobile devices or objects such as cellphones, watches, vehicles or the like. Using wireless communication technology may further allow to simplify an implementation or an integration of components into a larger system or systems in a larger object by avoiding or at least reducing a wire-bound communication infrastructure.

However, in a vast number of applications, radio-frequency communication technologies are used, in which analog or digital signals are encoded and transmitted via an antenna to the corresponding recipient. The recipient also comprises an antenna, which is typically used to provide the received radio-frequency signals to a corresponding radio-frequency receiver comprising a low noise amplifier (LNA) along with one or more filters to influence the signal quality, the noise distribution or other signal-related parameters of the received signal.

Implementing at least one such filter is often dictated by the desire of the system to be operated also under more adverse operating conditions. For instance, in the case of one or more components or systems communicating in close vicinity to one another, the components or systems may disturb one another.

For instance, in today's cars and other vehicles a large number of transmitters and receivers may operate, which transmit data within the car, but also to outside entities such as an emergency center allowing a quicker response in case of an accident, a technical monitoring center, which may help the driver of such a car to cope with technical problems at an earlier stage, or similar outside entities.

The EP 2 498 332 A1 describes a variable filter and communication apparatus. The US 2002/0032788 A1 describes a method and means for transmitting data of different quality of service in internet protocol datagrams, while the EP 2 254 195 A1 describes a tunable band-pass filter.

Based on receiver infrastructures comprising conventional filters, a demand exists to improve a trade-off between frequency-related flexibility and frequency agility of such a receiver infrastructure.

However, also in other fields of technology and applications, a similar demand exists.

SUMMARY

This demand may be satisfied by a filter or a method for filtering an analog radio-frequency input signal according to any of the independent claims.

A filter according to an embodiment comprises a splitter configured to split an analog radio-frequency input signal into at least a first signal and a second signal, a first signal path configured to generate, based on the first signal, a time-delayed signal delayed by a predetermined delay time in the time domain, a second signal path configured to generate, based on the second signal, a phase-shifted signal shifted by a controllable predetermined phase shift in the phase domain, and a coupler configured to generate an output signal based on the time-delayed signal and the phase-shifted signal.

Using the filter according to an embodiment may, in terms of frequency response, allow a more flexible and agile response to counteract an influence of another radio-frequency signal source. By controlling the predetermined phase shift in the phase domain, in view of the predetermined delay time a notch filter-characteristic may be achieved allowing a frequency component of the signal source to be at least partially removed from the spectrum of the input signal by destructive interference. By controlling the predetermined phase shift a flexible and agile filter characteristic in terms of its frequency response may be implemented.

The first signal path operates in the time domain, while the second signal path operates in the phase domain. In other words, the first signal path influences the propagation time of the first signal, its components, a signal derived from the first signal or its components, while the second signal path influences the phase of the second signal, its components, a signal derived from the second signal or its components. For instance, in the first signal path a phase shift caused by the predetermined delay time may be essentially linear with the frequency, while the phase shift comprises typically a non-linear dependency on the frequency of the respective signal or its components.

Optionally, the second signal path may comprise a controllable phase-shifter circuit configured to shift the phase of the second signal or a signal derived from the second signal via the predetermined phase shift in the phase domain to generate the phase-shifted signal. In this case, the phase-shifter circuit may be optionally configured to generate the phase-shifted signal with a phase shift being controllable by at least one control signal.

Optionally, the phase-shifter circuit may further be configured to generate the phase-shifted signal with an amplitude being controllable by the at least one control signal. This may allow controlling the attenuation more precisely by adjusting the amplitude of the phase-shifted signal to match that of the time-delayed signal to achieve a higher degree of destructive interference.

Additionally or alternatively, a filter may further comprise a control circuit configured to generate the at least one control signal such that the phase shift and the time delay correspond to a predetermined notch frequency of the filter causing the time-delay signal and the phase-shifted signal to at least partially destructively interfere at the notch frequency. By implementing such a control circuit, it may be possible for a system comprising such a filter to react more flexibly and to more quickly change to its operational conditions including, for instance, unwanted high signal levels, which are also referred to as blockers.

To at least partially destructively interfere at the notch frequency, the time-delayed signal and the phase-shifted signal may comprise at the notch frequency a relative phase shift to one another of approximately 180° or $\pi$, having approximately the same amplitude. The closer the relative phase difference between the phase-shifted signal and the time-delayed signal to 180° and the more equal the amplitudes of the two signals are, the better the quality of the destructive interference and, hence, the attenuation of the signal component at the notch frequency is. However, attenuating a signal component at the notch frequency does not require the relative phase difference and the amplitudes of the two signals to be precisely 180° and to be equal, respectively.

Optionally, the control circuit may be configured to generate the at least one control signal such that the time-delayed signal and the phase-shifted signal destructively interfere essentially completely at the notch frequency. For instance, the control circuit may be configured to generate the at least one control signal such that the amplitude of the phase-shifted signal essentially corresponds to the amplitude of the time-delayed signal at the notch frequency such that the phase-shifted signal essentially completely destructively interferes at the notch frequency.

Optionally, the control circuit may comprise a digital-to-analog converter (DAC) and a digital processing unit. In this case, the digital-to-analog converter may be configured to generate the at least one control signal based on a digital signal generated by the digital processing unit. The digital processing unit may be configured to execute a program.

Additionally or alternatively, the phase shifter circuit may comprise a vector modulator. This may allow a comparably simple implementation allowing a high degree of accuracy concerning the phase shift independent of the actual frequency.

Optionally, the vector modulator may be configured to generate the phase-shifted signal with a phase shift being controllable by an I-signal and a Q-signal. By controlling the I-signal and the Q-signal it may be possible to not only control the phase shift but also the amplitude of the phase-shifted signal.

Additionally or alternatively, the first signal path may comprise a delay element configured to delay the first signal or a signal derived from the first signal by the predetermined delay time in the time domain to generate the time-delayed signal. The delay element may be configured to generate the time-delayed signal with the delay time being essentially constant over a payload frequency range of the input signal. For instance, the delay element may comprise at least one of a transmission line, an active circuit configured to delay the first signal or a signal derived from the first signal via the predetermined delay time in the time domain and a passive circuit configured to delay the first signal or the signal derived from the first signal by the predetermined delay time in the time domain. Examples of a passive circuit comprise the previously-mentioned transmission line, bulk acoustic wave (BAW) delay lines, surface acoustic wave (SAW) delay lines, coaxial delay lines and similar circuits. Examples of an active circuit comprise, for instance, an amplifier such as a low noise amplifier (LNA).

Optionally, the first signal path may comprise a plurality of delay elements, which may be coupled in parallel to a switch, wherein the switch is configured to couple one delay element of the plurality of delay elements to the splitter, and wherein the delay elements of the plurality of delay elements are configured to delay the first signal or the signal derived from the first signal by a different predetermined delay time. This may allow controlling the shape of the filter characteristic more precisely. The switch may comprise a radio-frequency (RF) switch or a multiplexer.

Additionally or alternatively, the splitter may comprise a power splitter. A power splitter may be configured to split the input signal into the first and second signals comprising spectral densities being essentially proportional to one another with respect to at least one of a power and an amplitude on a linear or a logarithmic scale as a function of frequency. Moreover, the spectral densities of at least one of the first signal and the second signal may also be proportional to a spectral density of the input signal with respect to at least one of a power and an amplitude on a linear or logarithmic scale as a function of frequency. Each of these proportionalities may be valid only in a finite reference frequency range, such as a payload frequency range of the input signal.

Optionally, the power splitter may be a 3 dB-power splitter. Here, the power splitter may be configured to split the input signal into the first and second signals comprising essentially the same power density over the reference frequency range.

Additionally or alternatively, the coupler may comprise a power coupler. This may allow a simpler implementation of a filter. Optionally, the power coupler may be identical to the power splitter. For instance, the coupler may be configured to generate the output signal based on the time-delayed signal and the phase-shifted signal by superpositioning, summing or adding the time-delayed signal and the phase-shifted signal.

Additionally or alternatively, the input signal may comprise at least one of a plurality of frequencies and a finite frequency range. In other words, the filter is by far not required to be operational only with respect to a single frequency, such that the input signal may also be referred to as a monochromatic wave, but may be configured to be operational with respect to a frequency range or a plurality of frequencies. The term "plurality" refers to at least two of the objects, entities or characteristics referred to by the term.

A method for filtering an analog radio-frequency input signal may comprise splitting the input signal into at least a first signal and a second signal, generating, based on the first signal, a time-delayed signal delayed by a predetermined delay time in the time domain, generating, based on the second signal, a phase-shifted signal shifted by a controllable predetermined phase shift in the phase domain, and generating an output signal based on the time-delayed signal and the phase-shifted signal.

Generating the output signal based on the time-delayed signal and the phase-shifted signal may comprise superpositioning, summing or adding the time-delayed signal and the phase-shifted signal.

Additionally or alternatively, the method may further comprise determining the predetermined phase shift, wherein generating the phase-shifted signal comprises generating the phase-shifted signal phase-shifted by the determined phase shift in the phase domain.

A filter according to an embodiment comprises a power splitter configured to split an analog radio-frequency input signal into at least a first signal and a second signal, a delay element configured to delay the first signal by a predetermined delay time in the time domain, a vector modulator configured to phase shift the second signal controllably by a predetermined phase shift in the phase domain, and a coupler configured to generate an output signal based on the time-delayed signal and the phase-shifted signal.

A receiver system comprises an amplifier, a filter according to an embodiment coupled to an output of the amplifier to receive an amplified signal from the amplifier as the radio-frequency input signal, and a radio-frequency receiver circuit coupled to an output of the filter to receive the output signal of the filter.

Embodiments also provide a receiver system comprising a low noise amplifier, which is coupled to an input of a filter according to the above, a radio frequency receiver circuit which is coupled to an output of the filter, and a control unit configured to control the filter such that a predetermined unwanted signal component is reduced at the output of the filter.

Embodiments may allow reduction of an unwanted signal, e.g. a blocker or interferer, using the filter structure as above. The position of such unwanted signal in the spectrum may vary and embodiments may determine such position and adapt the filter accordingly, e.g. by means of software control. Consequently embodiments may enable a more frequency agile receiver system, which may allow simplification or even omission of further filter circuitry.

Embodiments also provide a method for a receiver system comprising amplifying a receive signal and determining an unwanted signal component in the amplified signal. The method further comprises determining a delay time and a phase shift based on the unwanted signal component, and filtering the amplified signal according to the above method using the delay time as predetermined delay time and using the phase shift as predetermined phase shift. Embodiments may enable a reduction of unwanted signals in a receive signal before converting the receive signal to the digital domain. Reduction of unwanted signals may enable a better use of the subsequent components, e.g. a better use of a dynamic range of an analog/digital converter. Embodiments may further allow to omit or to use less complex band-pass filters in a receiver system before conversion.

Optionally, an input of the amplifier may be coupled to a terminal configured to be coupled to an antenna or an antenna coupled to the amplifier. Additionally or alternatively, the amplifier may be a low noise amplifier (LNA). Additionally or alternatively, the radio-frequency receiver circuit may comprise a mixer configured to downmix the output signal of the filter or a signal derived from the output signal of the filter to an intermediate frequency regime or a baseband. Additionally or alternatively, the radio-frequency receiver circuit may further comprise an analog-to-digital converter (ADC) configured to digitize the output signal of the filter or a signal derived from the output signal of the filter. The radio-frequency receiver circuit may additionally or alternatively further comprise a processing circuit configured to decode payload data from the output signal of the filter or a signal derived from the output signal of the filter.

Electrical, electronical and other components can be coupled to one another directly or indirectly in such a way that information carrying or informing comprising signals can be interchanged or sent from one component to the other component. Moreover, electrical and other components can be electrically coupled directly or indirectly to provide them with electrical energy, for instance, by providing a supply voltage and a supply current to the respective components.

Information carrying signals or information comprising signals can be sent, provided or interchanged, for instance, using electrical, optical, magnetic or radio signals. The signals can be in terms of their values and their timely sequence independent from one another be discrete or continuous. For instance, the signals may be analog or digital signals.

Mechanical components may be coupled to one another directly or indirectly via a further component.

BRIEF DESCRIPTION OF THE FIGURES

In the following, embodiments will be described and explained in more detail with reference to the enclosed Figures.

DETAILED DESCRIPTION

Various examples and embodiments will now be described in more detail with reference to the enclosed drawings, which illustrate some examples and embodiments. In the Figures, the thicknesses of the lines, layers and regions may be exaggerated for clarity.

In the Figures identical or similar reference signs refer to identical or similar objects, elements or processes throughout the description, which may be implemented identically or in a modified form with respect to one characteristic, some characteristics or all characteristics. Details and examples relating to one object, element or process described in the context of one embodiment or one Figure, may easily be transferred to other embodiments or Figures, unless explicitly or for technical reasons implicitly excluded.

As briefly discussed before, components of a system or systems communicate with one another unidirectionally or bidirectionally. In some fields of application, a system may also communicate with an outside entity such as a surveillance center, a safety center or a monitoring center to name just a few examples. For different reasons such as mobility of such a system or easier implementation to name just two reasons, the respective components or systems communicate with one another or with the outside entity using wireless communication technologies and protocols. In many cases, a radio-frequency based radio communication is employed allowing—depending on the operational parameters and other environmental factors as well as technical and economical boundary conditions—a reliable way of communicating with an adequate bandwidth.

However, due to the sheer number of components and systems and the limited availability of radio resources, components as well as systems may disturb operation of another component or system. Although still not available, the ultimate goal in many applications is using a software-defined radio system, which offers complete flexibility over the frequency band of interest. However, in today's systems a more conventional approach is often used.

Figure 1:
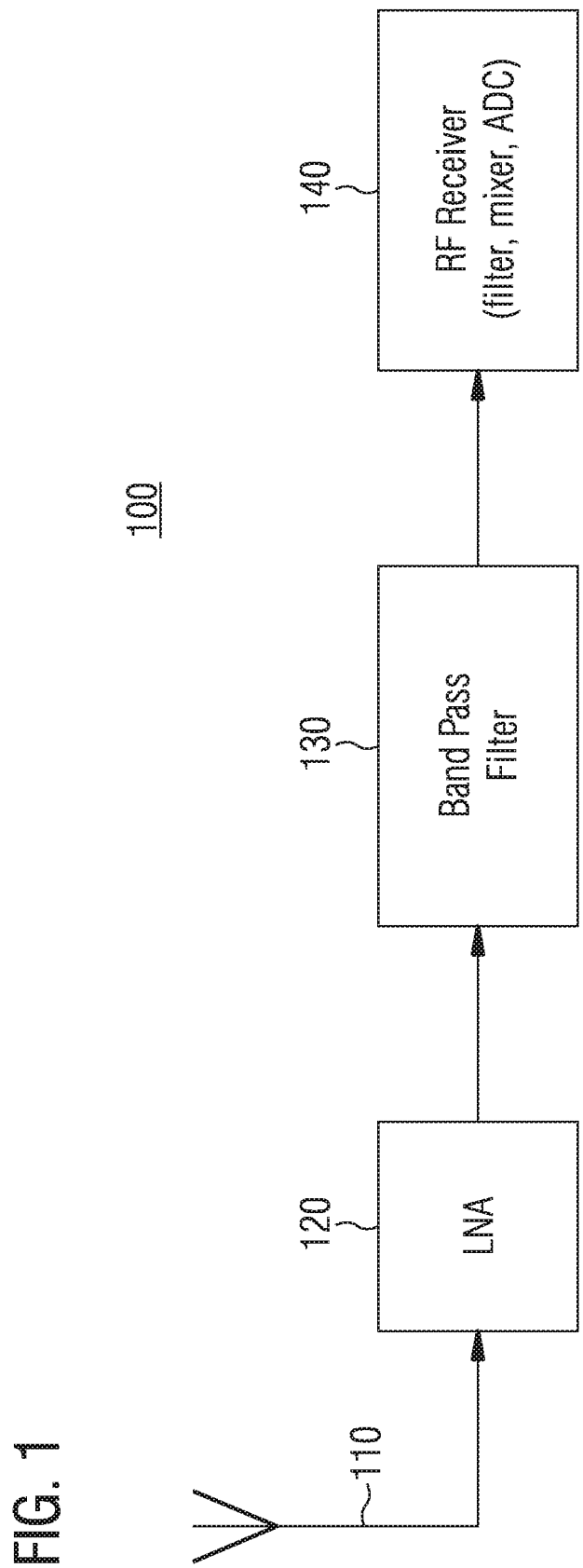
FIG. 1 shows a simplified block diagram of a conventional radio-frequency receiver circuit.

FIG. 1 shows a simplified block diagram of a generic or conventional radio-frequency (RF) receiver system 100. Such a system 100 conceptionally comprises an antenna 110, a low-noise amplifier (LNA) 120, a bandpass filter 130, which may also be referred to as a blocker remover, and a receiver circuit 140, which may comprise one or more further filters, a mixer to downmix the received radio-frequency (RF) signals to an intermediate frequency regime or a baseband as well as an analog-to-digital converter (ADC) to digitize the received and processed signals to allow a further processing in the digital domain. The ADC forms the boundary between the analog part of the system comprising, for instance, the low noise amplifier 120, the bandpass filter 130 and the mixer, from the digital domain, which may further comprise a processing unit such as a central processing unit (CPU), other processor-based systems or other signal processing circuits in the digital domain.

Although in the context of FIG. 1 and the further Figures, systems will be described which operate in the digital domain, embodiments are by far not limited to digital applications, but may also be used in the context of analog systems for instance in the field of airband or other analog transmission schemes.

Despite switchable or tunable bandpass filters, today's systems sometimes do not have a frequency agility as desired in some applications. The frequency dynamics of such a system 100 is typically limited by the band selection filter or bandpass filter 130 as shown in FIG. 1. The band selection filter 130 is typically based on frequency selective hardware components, which are either fixed in their behavior, such as resistors, capacitors, inductors or the like, or have only a small tuning range like pin diodes, tunable capacitors and other examples. While it is possible to influence the shape and the band location of a filter using these tunable components, it is comparably difficult to achieve a wide tuning range concerning the data bandwidth and/or a center frequency. Alternative techniques use RF switches inside in the bandpass filter to enable or disable fixed frequency electrical components to switch in or out filter branches, to enlarge or to reduce an effective capacitor over switching in additional capacitors in series and/or parallel. Such systems can achieve a considerable tuning range. However, they are typically limited in granularity, as components can only be enabled or disabled in discrete steps. To achieve an extremely fine granularity, a very large number of components and an equally large number of RF switches would have to be implemented.

In today's applications, specialized filter bands are used, each with its own fixed response. RF switches and multiplexers at the same input and the output of said filters select one of many filter bands. Such a system allows a number of bands to be supported by one and the same radial front end. However, these systems may only allow selecting one of the pre-defined filter responses. A software defined creation of a new response is not possible based on these systems.

As a consequence, today's systems may not be as frequency agile as desired, for instance, to allow using a system for a long time without changing hardware components. The frequency dynamics may be limited by the band selection filter in the form of the bandpass filter 130 as depicted in FIG. 1. Furthermore, it may be difficult to achieve a wide tuning range in data bandwidth and/or center frequency without a significant implementation effort. The alternative techniques mentioned above typically allow only enabling different filter characteristics in discrete steps. For instance RF switches and multiplexers may allow to select one of the predefined filter responses, but may not allow a software defined creation of a new response.

To illustrate the working principles, fields of application and capabilities of an embodiment such as a filter or a method for filtering an analog radio-frequency input signal, the system 100 depicted in FIG. 1 will now be analyzed in more detail.

The bandpass filter 130 in FIG. 1 serves two main tasks. In a clean spectrum where no blocking signals, no interference and only the wanted RF signal is present, the bandpass filter 130 removes the amount of noise which would otherwise be coupled into the receiver circuit 140. However, in a real spectrum, typically large blockers or interferers are present next to the wanted RF signal. Here the bandpass filter 130 is intended to remove the spectral energy of the unwanted signal and thus help to keep the RF receiver path's sensitivity appropriate for the wanted signal.

Figure 2:
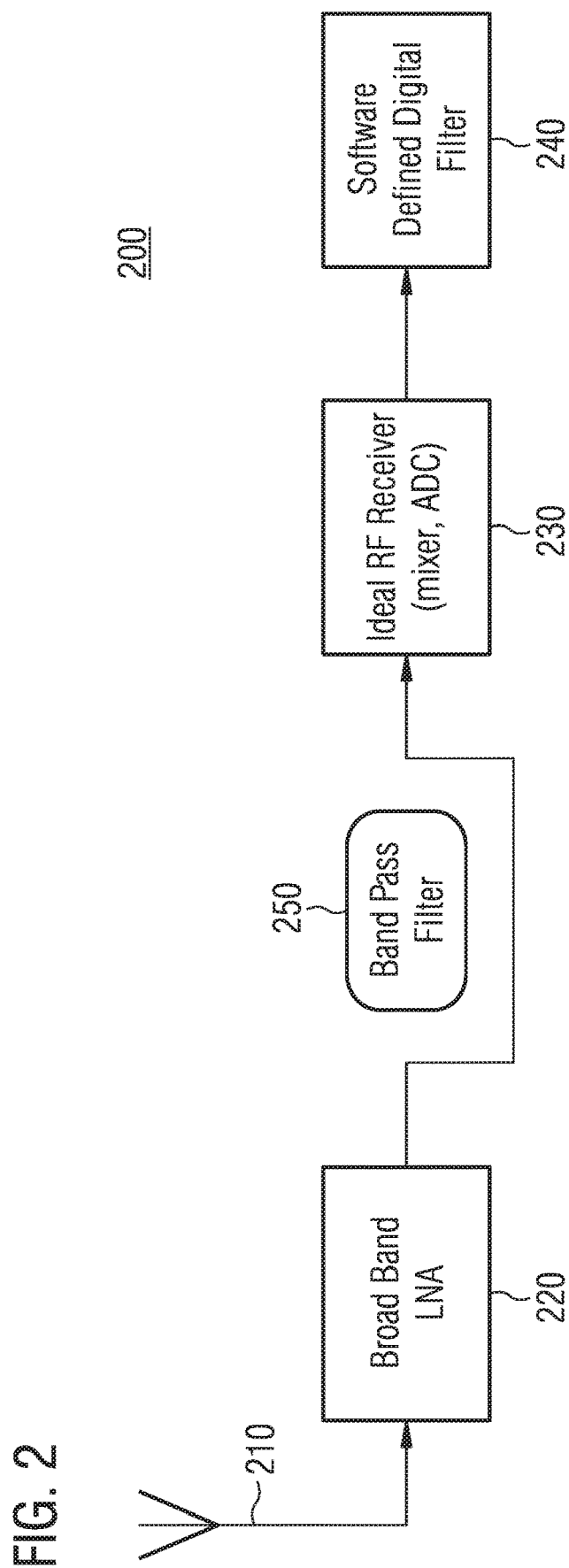
FIG. 2 shows a simplified block diagram of a hypothetical ideal radio-frequency receiver circuit.

FIG. 2 shows a simplified block diagram of a hypothetical ideal radio-frequency receiver system 200. The system 200 also comprises an antenna 210 which is coupled to a high dynamics broadband LNA 220, which is coupled to an ideal RF receiver circuit 230, which is in turn coupled to a software defined digital filter 240. As indicated in FIG. 2, such a system may not need a bandpass filter 250 which is avoided between the high dynamics broadband LNA 220 and the following ideal radio-frequency receiver circuit 230. In such a system 200, the bandpass filter 250 may be completely omitted. The receiver circuit 230 may in this case only comprise a mixer for downmixing the radio-frequency signal as well as an ADC to digitize the downmixed signals which are then processed in the digital domain by the software defined digital filter 240. The receiver circuit 230 in this hypothetical ideal radio-frequency system 200 does not comprise an analog filter comparable to the bandpass filter 130 of the receiver system 100 of FIG. 1.

In the ideal RF receiver system 200 shown in FIG. 2, the LNA has an infinite dynamic range. Such an ideal receiver system 200 could then deal with signal impairments as described above. Large unwanted blocking signals as well as the broadband noise can be immediately digitized by the ADC of the receiver circuit 230. The follow on digital filter 240 having a sufficiently high precision can then take out the unwanted noise and remove the blocking signals by effectively implementing the bandpass filter function of the bandpass filter 130 of the system 100 in FIG. 1. Such a digital filter 240 can be controlled dynamically via software enabling a software defined radio (SDR) function.

Unfortunately, the ideal receiver system 200 is far from being implementable based on today's technology. For instance, a broadband LNA 220 with a sufficiently high, in theory infinitely high dynamic range allowing receiving large blocker signals as well as small wanted RF signals is—at best—very difficult to implement if implementable at all. In other words, real RF receiver modules have a limited dynamic range. Large unwanted signals such as the blockers, have therefore the tendency to overload the analog input of the ADC leading to clipping of the input signal and causing distortions to the received spectrum. Decoding small wanted RF signals may therefore be difficult at best. In such a scenario, several options are possible which are illustrated in the following Figures.

Figure 3:
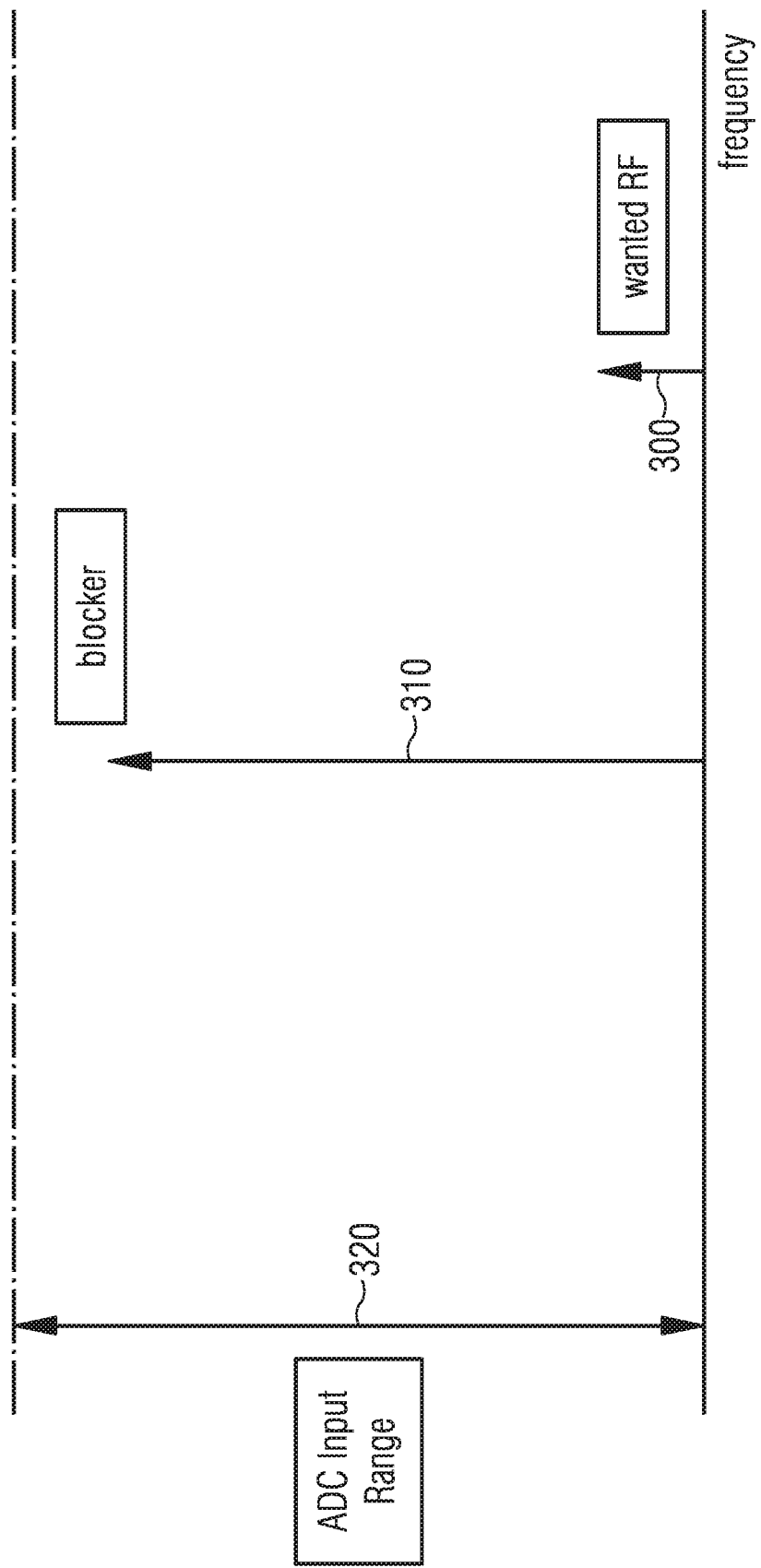
FIG. 3 illustrates a frequency spectrum comprising a blocker and a wanted RF signal.

FIG. 3 shows a spectral density of a radio-frequency input signal as a function of the frequency, which comprises apart from a wanted RF signal 300 a blocker 310 having a significantly higher amplitude or energy compared to the wanted RF signal 300. As a first counter measure, it is possible to reduce the gain of the LNA 120 of the receiver system 100 depicted in FIG. 1 so that the largest input signal component still fits completely into an input range 320 of the ADC of the receiver circuit 140. In other words, the input range 320 of the ADC is chosen or determined by reducing the gain of the LNA 120 in such a way that the blocker 310 still fits completely into the input range 320. As a consequence, it may be possible to remove the bandpass filter 130 from the receiver system 100 depicted in FIG. 1.

While this may conceptually work for some scenarios, the limited dynamic range of the ADC is likely to lead to a situation where the wanted RF signal 300 can no longer be detected in the noise floor of the input signal (not depicted in FIG. 3). In other words, the limited resolution of the ADC caused by the reduced gain of the LNA 120 may cause the system not to be capable of detecting the wanted RF signal 300.

Figure 4:
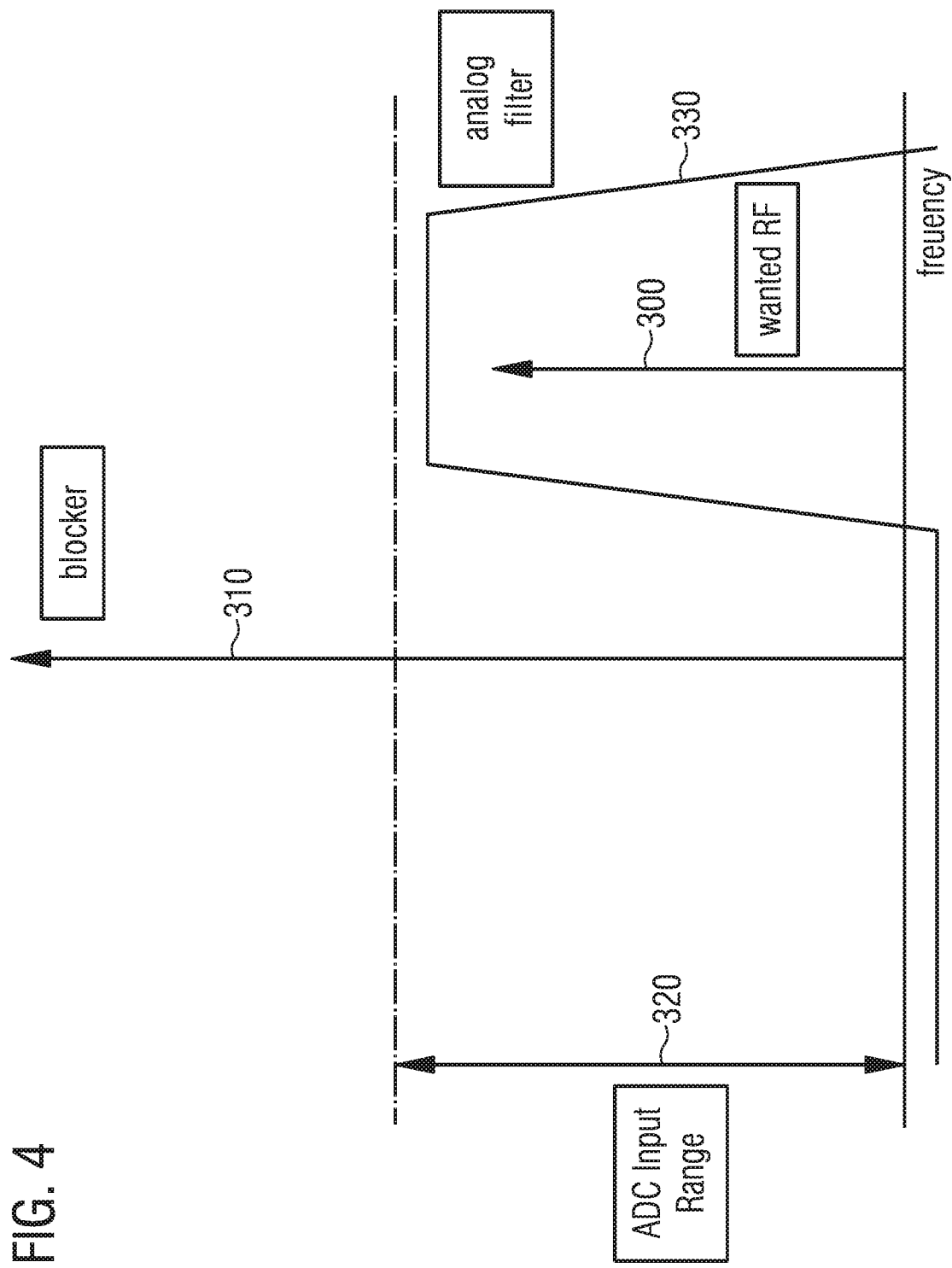
FIG. 4 illustrates a frequency spectrum comprising a blocker and a wanted RF signal using an analog bandpass filter.

FIG. 4 illustrates another option to cope with the problem of a large blocker 310 compared to a smaller wanted RF signal 300 in a spectral density. Here, the situation is depicted which may be implemented using the receiver system 100 of FIG. 1. To be a little more precise, compared to the situation of FIG. 3, an analog filter in the form of the bandpass filter 130 is included to remove the amplitude and, hence, the spectral energy of the blocking signal 310, which allows the LNA gain to be increased. As a consequence, the input range 320 is larger than the spectral energy or amplitude of the wanted RF signal 300.

However, to allow the gain of the LNA 120 to be increased to such an extent that the input range 320 of the ADC is comparable, but smaller than that of the wanted RF signal 300, an analog filter in the form of the bandpass filter 130 is implemented, the filter characteristic 330 of which is depicted in FIG. 4. This is the approach which is conceptually used in today's applications. The bandpass filter 130 attenuates signals outside the band of interest and allows the received signal to be amplified to achieve a suitable signal-to-noise-ratio (SNR) figure at the ADC. As already explained, the filters typically have a fixed frequency response which his difficult to alter via software in a highly dynamic way.

As depicted in FIG. 4, the bandpass filters 130 used in today's RF front ends take a "blanket approach". They aim to attenuate signals outside the band of interest, whether there are any blockers 310 or not.

Figure 5:
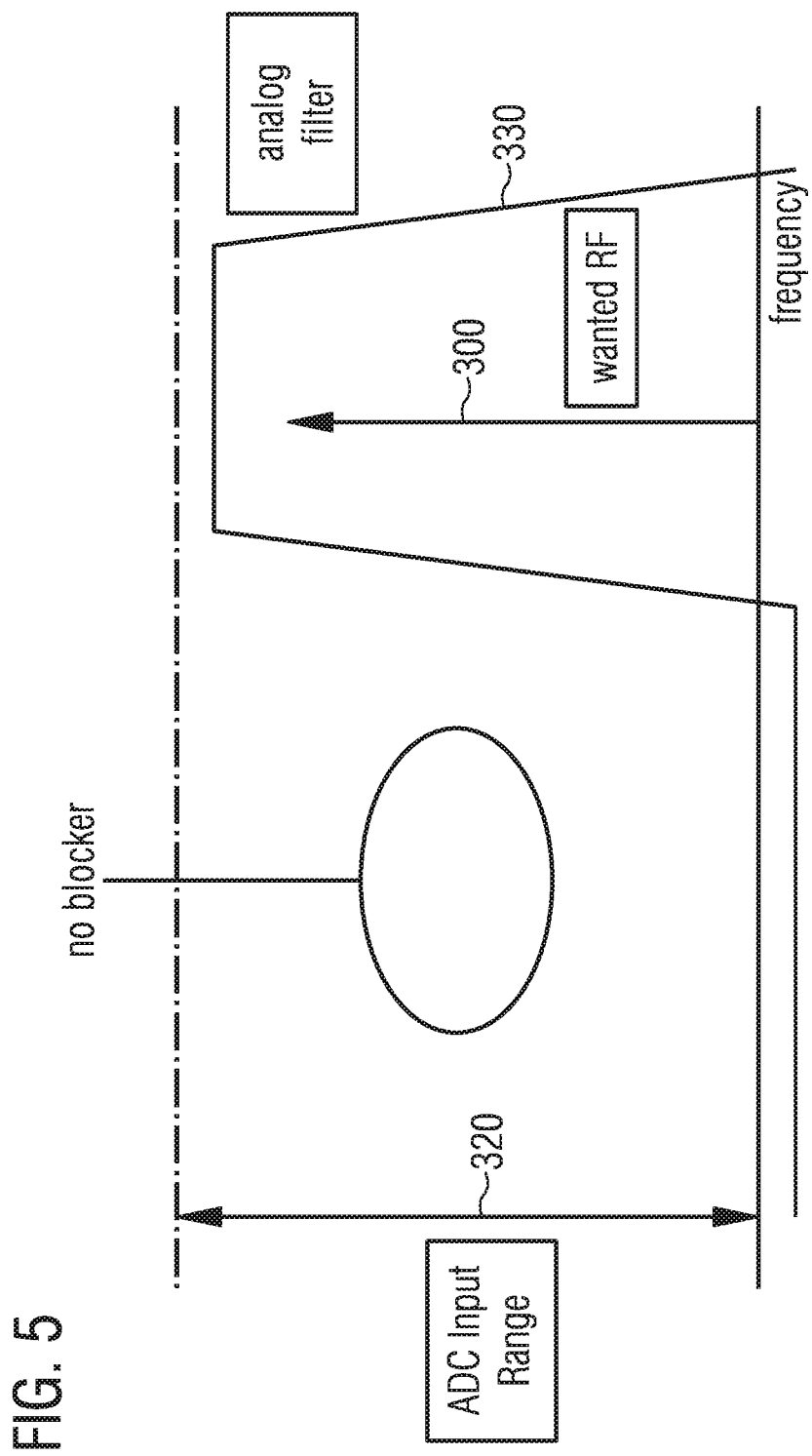
FIG. 5 shows a frequency spectrum comprising a wanted RF signal using an analog band-pass filter in the absence of a blocker.

The situation depicted in FIG. 5 is, however, different from the situation of FIG. 4, since the blocker signal 310 is absent as shown by the ellipse in FIG. 5. The situation depicted in FIG. 5 without a blocking signal in the first place, is a scenario which is not that seldom. In such scenarios, the removal of the analog bandpass filter 130 in the RF path may be possible and perhaps even beneficial. For instance, it may be possible to make the RF front end more frequency agile, for instance by programming a local oscillator (LO) of an RF receive integrated circuit (IC). Equipped with an adequate, realistic dynamic range, such an analog front end could be programmed via a set of registers, bringing it closer to the previously-described FDR concept. In other words, if there are no blockers available, the bandpass filter 130 is theoretically not necessary and may prevent a frequency agility desirable in some applications.

However, in reality there are cases in which blockers exist and contemporary state-of-the-art RF receivers do not necessarily have the dynamic range required to sample those while still preserving sufficient SNR for the wanted signal to be decodable.

Embodiments, for instance in the form of a filter or a method for filtering an analog radio-frequency input signal, may be used as an adaptive blocker for software defined radio front ends, which may allow overcoming the previously mentioned limitations of the conventional approaches by allowing a notch to be placed at a software-defined frequency location with a comparably high flexibility and accuracy. Embodiments like a filter or a method for filtering an analog radio-frequency input signal may be used as a highly dynamic analog filter to selectively take out such blocking signals. Embodiments, as will be outlined in more detail below, can be built and operated on the basis of a self-cancellation system.

Figure 6:
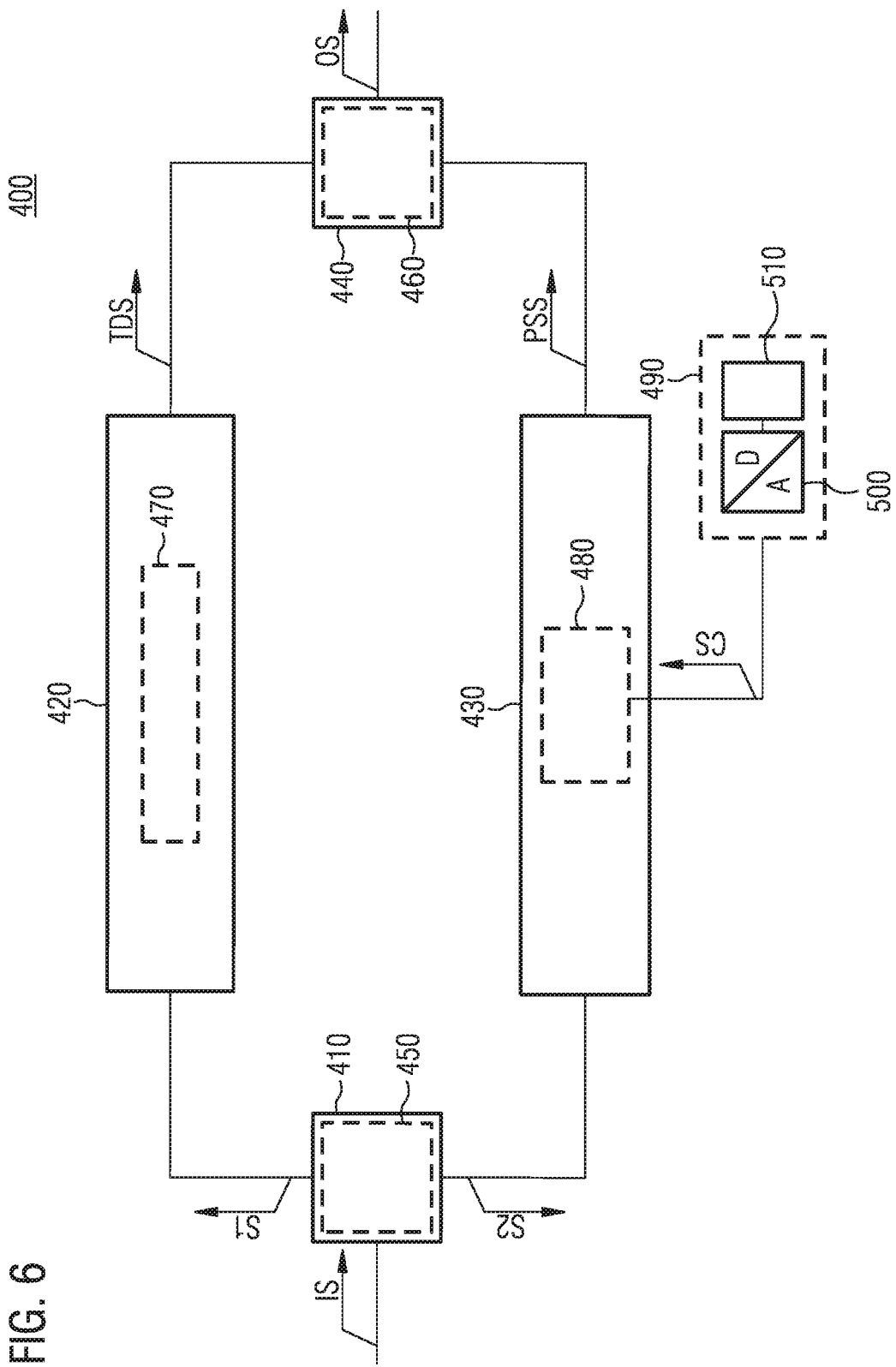
FIG. 6 shows a simplified block diagram of a filter according to an embodiment.

FIG. 6 shows a block diagram of a filter 400 according to an embodiment. The filter 400 comprises a splitter 410 which is specifically designed and, hence, configured to split an analog radio frequency input signal IS into at least the first signal S1 and a second signal S2. The filter 400 further comprises a first signal path 420, which is configured to generate a time-delayed signal TDS based on the first signal S1 by delaying the signal S1 or a signal derived from the first signal by a predetermined delay time d1 in the time domain. The filter 400 further comprises a second signal path 430 configured to generate a phase-shifted signal PSS based on the second signal S2 by shifting the second signal S2 or a signal derived from the second signal S2 by a controllable predetermined phase shift in the phase domain.

The first and second signal paths 420, 430 operate in different domains and, hence, based on different physical effects as well as technologies. While the first signal path 420 influences the propagation time of a signal, the second signal path 430 directly influences the phase of a signal provided to the second signal path 430. For a fixed frequency f, a time delay d1 and a phase shift p1 are related to one another by a proportionality constant of $2\pi \cdot f$. In other words, in the first signal path 420 by influencing the propagation time of the signal and, hence, causing a time delay d1, a phase shift p1 is caused which is essentially linear with a frequency f of the signal.

In the case of the second signal path 430 operating in the phase domain, the predetermined and controllable phase shift p2 is under ideal circumstances independent of the frequency f of the signal provided to the second signal path 430. However, due to parasitic effects, technological restraints, implementation details and other effects, the phase shift imposed by the second signal path 430 is typically not constant. However, it is non-linear as a function of the frequency f.

However, the input signal IS to be processed by the filter 400 is a signal comprising not just a single frequency f, but at least a plurality of frequencies or even a finite frequency range. As a consequence, the first signal path 420 and the second signal path 430 lead to a measurable difference with respect to the phase shifts caused due to the different schemes of manipulating the signals provided to the two paths 420, 430.

The filter 400 further comprises a coupler 440 which is configured to generate an output signal OS based on the time delayed signal TDS and the phase-shifted signal PSS as generated by the first and second signal paths, 420, 430, respectively.

The splitter 410 may, for instance, be implemented as a power splitter, which splits the input signal IS into the first and second signals S1, S2, respectively, in such a way that the first and second signals comprise spectral densities which are essentially proportional to one another with respect to a power or an amplitude on a linear or logarithmic scale as a function of frequency. The spectral densities of the first signal S1 and/or of the second signal S2 may further be proportional to a corresponding spectral density of the input signal IS as function of frequency. Naturally, since in a real life implementation the splitter 410 is not an ideal device, each of these proportionalities may be present only in a finite payload frequency range or another reference frequency of an input signal IS.

In some implementations, the power splitter 450 may be a 3 dB-power splitter which is configured to split the input signal into the first and second signals S1, S2 having essentially the same spectral density with respect to the payload frequency range or the reference frequency range of the input signal IS.

Similar to the splitter 410 also the coupler 440 may comprise a power coupler 460, which may be implemented to be essentially identical to the power splitter 450. However, in other implementations implementing the power splitter 450 different from the power coupler 460 may also be advisable depending on parameters of a concrete implementation of a filter 400.

The first signal path 420 may comprise a delay element 470 to generate the time-delayed signal TDS, which may for instance be implemented as a transmission line, an active circuit configured to delay the first signal or a signal derived from the first signal by the predetermined delay time in the time domain or a corresponding passive circuit. Apart from the transmission line, which is also a passive circuit, a bulk acoustic wave (BAW) delay line, a surface acoustic wave (SAW) delay line or a coaxial delay line may be used. An example of an active circuit is an amplifier such as a low noise amplifier (LNA). Under ideal circumstances, the delay element 470 causes a delay time being essentially constant over the payload frequency range or another reference frequency range of the input signal IS. However, in a real-life implementation, it may only be possible to achieve a delay time being essentially constant over any of the previously-mentioned frequency ranges of the input signal IS due to stray effects, tolerances or other technical and economical boundary conditions.

The second signal path 430 may comprise a controllable phase-shifter circuit 480, which is configured to shift the phase of the second signal S2 or a signal derived from the second signal S2 by the predetermined phase shift p2 in the phase domain to generate the phase-shifted signal PSS. To control the phase shift p2, the phase shifter circuit 480 may be designed to receive one or more control signals CS and to control the phase shift p2 accordingly. As a further option, the phase shifter circuit 480 may also be designed to control an amplitude of the phase-shifted signal PSS in response to the one or more control signals CS. By controlling the phase shift p2 and optionally the amplitude of the phase-shifted signal PSS, it may be possible to achieve an essentially complete destructive interference of the time-delayed signal TDS and the phase-shifted signal PSS at a determinable and due to the controllability of the phase shift p2 controllable notch frequency. Due to the destructive interference of the two signals TDS and PSS, a notch-like filter characteristic may be achieved which may be used to attenuate or even eliminate a blocker or a similar signal as depicted in FIGS. 3 and 4 without having to implement a bandpass filter 130.

The quality of attenuation may depend on the quality of the amplitude control of the phase-shifted signal PSS with respect to the time-delayed signal TDS. If the amplitudes are identical and if the coupler 440 comprises a 3 dB-coupler, in theory a complete suppression of a blocker may be achievable at the notch frequency. However, in a real-life implementation, typically only attenuation may be achieved. By controlling also the amplitude of the phase-shifted signal PSS, the degree of attenuation may be controlled.

To control the second signal path 430 or rather the phase-shifter circuit 480, the filter 400 may further comprise or be coupled to a control circuit 490, which may be specifically designed and, hence, configured to generate the one or more control signals CS in the previously described fashion. The control circuit 490 may comprise a digital-to-analog converter (DAC) 500 and a digital processing unit 510 such as a central processing unit (CPU) or a similar processor-based circuit. By a using a specific software, also general purpose components may be used to implement the control circuit 490 in the described way. The processing circuit 510 may be capable of running a program or software to control the phase-shifter circuit 480 by providing a digital signal to the DAC 500, which in turn converts the digital signal to the at least one analog control signal CS.

Before describing an embodiment of a self-cancellation filter 400 in more detail in the context of FIGS. 8 and 9, a receiver system 600 according to an embodiment will first be briefly described with reference to FIG. 7. The receiver system 600 shown in FIG. 7 comprises an amplifier 610, which may, for instance, be implemented as a low noise amplifier (LNA). An output of the amplifier 610 is coupled to an input of a filter 400 according to an embodiment to provide an amplified signal as the radio-frequency input signal IS to the filter 400. An output of the filter 400 is coupled to a radio-frequency receiver circuit 620. The output of the filter 400 provides the output signal OS of the filter 400 to the receiver circuit 620. The receiver circuit 620 may comprise a mixer to downmix the radio-frequency signal to an intermediate frequency regime or to the baseband as well as an analog-to-digital converter (ADC) to convert the analog signal into a digital signal for further processing and decoding. Accordingly, the receiver circuit 620 may also comprise a processing unit as mentioned before to perform the further processing of the received signal in the digital domain. As outlined before, the ADC, if implemented, forms or is part of the border between the analog part and the digital part of the receiver system 600.

Figure 7:
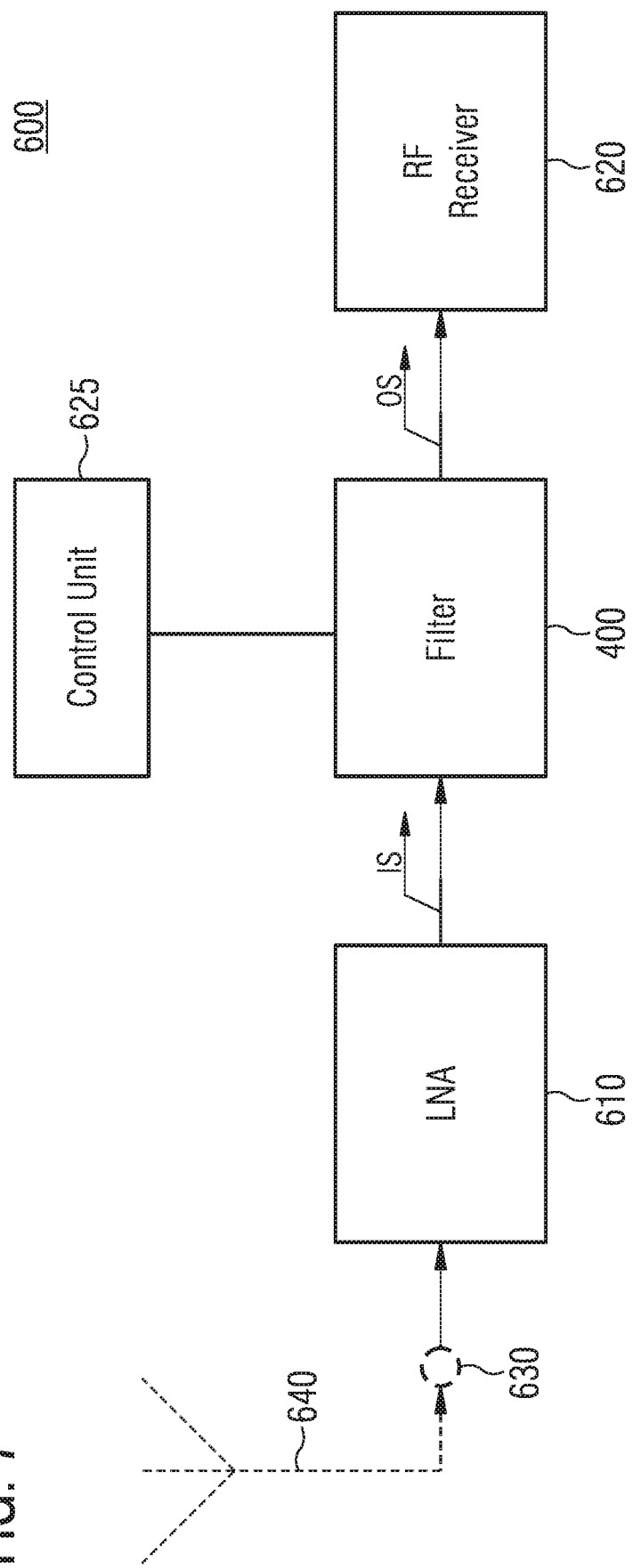
FIG. 7 shows a simplified block diagram of a receiver system according to an embodiment.

In the embodiment shown in FIG. 7 the low noise amplifier 610 is coupled to an input of an embodiment of the self-cancellation filter 400 according to the further description herein. The radio frequency receiver circuit 620 is coupled to an output of the filter 400. The embodiment further comprises a control unit 625, which is configured to control the filter 400 such that a predetermined unwanted signal component is reduced at the output of the filter 400. The predetermined unwanted signal component may correspond to one or more of the above-described blockers, narrow-band interference, an unwanted high signal level, a signal that would saturate a subsequent component such as an ADC, interference, etc.

In embodiments, the control unit 625 may be implemented using one or more processing units, one or more processing devices, any means for processing, such as a processor, a computer or a programmable hardware component being operable with accordingly adapted software. In other words, the described functions of the control unit 625 may as well be implemented in software, which is then executed on one or more programmable hardware components. Such hardware components may comprise a general purpose processor, a digital signal processor (DSP), a microcontroller, a field programmable gate array (FPGA), a programmable logic device, a programmable array logic (PAL) etc. In embodiments, the control module 625 may also be implemented using one or more application specific integrated circuits (ASIC).

As described above the control unit 625 may control the filter 400 such that a blocker, a signal contribution to the amplified signal of the blocker, respectively, is reduced or ideally eliminated. The control unit 625 itself or other components it may be coupled with, may determine information related to the according blocker, for example, in terms of a frequency, bandwidth, amplitude etc. it consumes in the spectrum. The control unit 625 may then be configured to determine control signals, e.g. in terms of delay time and/or phase shifts, for the filter 400 corresponding to said information as will be detailed subsequently. In a further embodiment multiple blockers or unwanted signals may be removed using the same or multiple filters 400, one or more control units 625, respectively. For example, a cascade of filters may be used and be controlled to reduce multiple interferers or blockers. In some embodiments, information on such blockers may be known in advance, e.g. because there is known activity in a band that has high signal levels. In some embodiments there may be means to adaptively determine blockers, e.g. by means of receive signal evaluation, estimation, e.g. based on ADC clipping, etc. In some embodiments such unwanted signal components may be adaptively tracked, the one or more filters 400 may be adaptively controlled and the unwanted signals may be adaptively reduced or ideally eliminated.

In some embodiments a bandpass filter may still be used to initially filter the receive signal. Such bandpass filter may, however, be omitted in some embodiments or be simplified in other embodiments. As the one or more filters 400 may enable suppression of unwanted signals such that the remaining signal fits to the dynamic properties of the subsequent components, the overall architecture of the receiver system may be simplified and/or rendered more frequency agile. It is to be noted that the receiver system 600 as depicted in FIG. 7 provides the output of the filter 400 to the radio frequency receiver circuit 620, which may comprise one or more components of the group of further filter circuitry, analog/digital converters, filters, processors, analog and/or digital signal processing, etc. These components may enable further digital filtering and further reduction or elimination of unwanted signals.

For example, bandpass filtering may be carried for subsequent signal detection. Such digital processing may be enabled by the filter 400 processing the amplified signal such that wanted signal components therein fit a dynamic range of a subsequent analog/digital converter and can hence be further processed in the digital domain. Embodiments may hence enable a more frequency agile receiver concept, where the filter 400 and the subsequent processing can be software controlled.

An input of the amplifier 610 may be coupled, for instance, to a terminal 630 for an antenna 640 or may be coupled to the antenna 640 without a corresponding terminal being coupled in between. However, also the antenna 640 is by far not required to be implemented in the framework of the receiver system 600.

Figure 8:
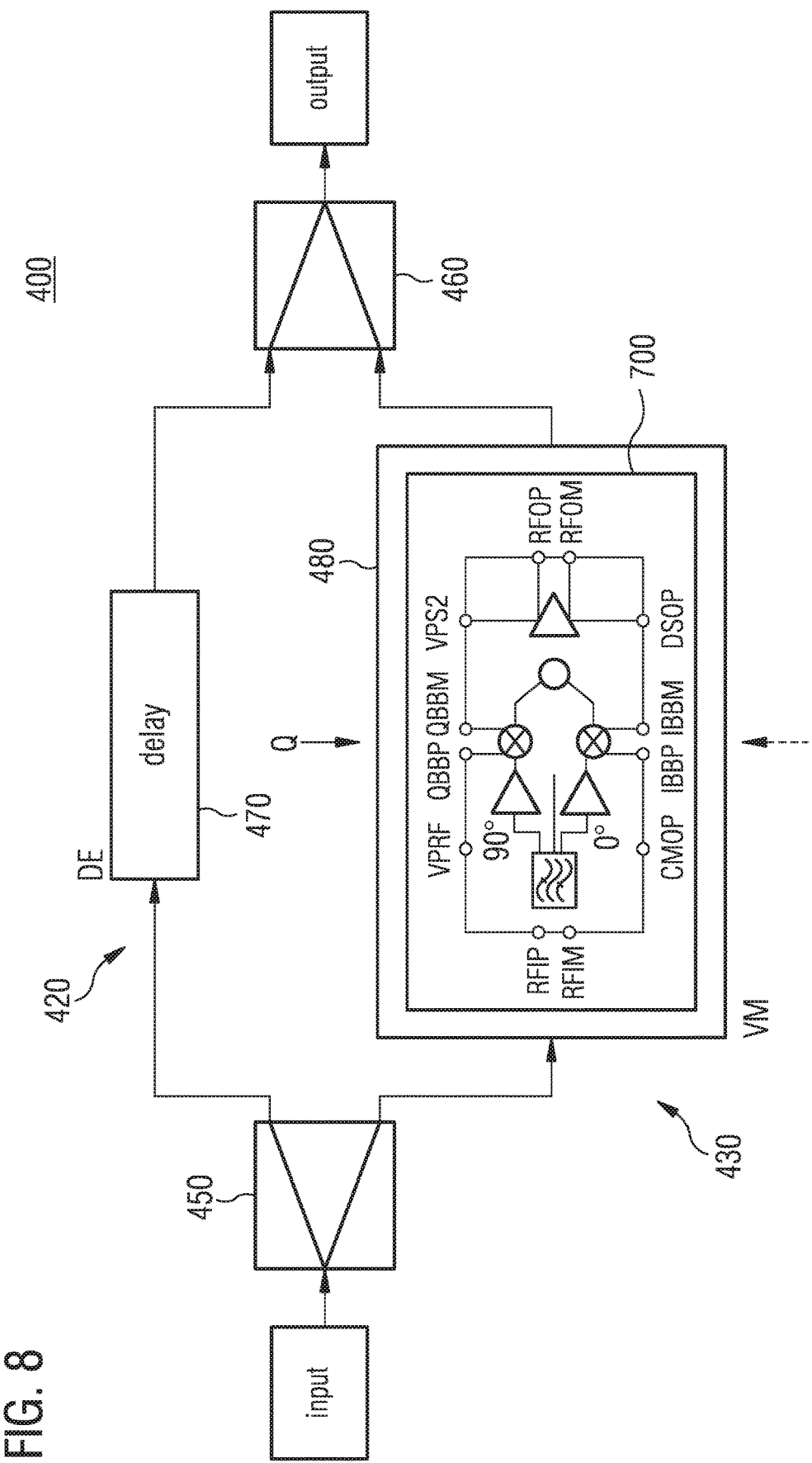
FIG. 8 shows a block diagram of a filter according to a further embodiment.

FIG. 8 shows a more detailed block diagram of a filter 400 according to an embodiment. As previously described, the filter 400 comprises a power splitter 450 as the splitter 410, a first signal path 420 causing the delay in the time domain, a second signal path 430 causing the phase shift in the phase domain, a power coupler 460 as a coupler 440, which are coupled as previously described between an input and an output. The self-cancellation filter 400 depicted in FIG. 8 uses a vector modulator 700 comprised in the phase-shifter circuit 480 to turn the phase of the signal by roughly 180° or π. The phase-modified or phase-shifted signal is then added to a delayed version of the original input signal. As outlined before, the resulting frequency response of such an arrangement follows a notch.

The input signal is split by the splitter 410 in the form of a power splitter 450 into the previously-mentioned two paths 420, 430. In the first path 420, the signal is fed through the delay element 470, which is also referred to in FIG. 8 by "DE". Such an element may be made from a transmission line, active and/or passive circuitry of equivalent function as outlined before. The phase response of the first signal path 420, which is also referred to as delay path, is ideally flat over the band of interest. However, a certain attenuation (al) is inherent to a realistic delay block. Depending on the implementation in mind, it may be interesting to reduce or even minimize the attenuation al. The amount of the delay or delay time d1 through the first signal path 420 will determine the shape of the notch of a filter characteristic. To be more precise, the delay time d1 influences the width of the notch. In principle, the smaller the delay time d1 is, the wider the notch of the filter characteristic is.

The second signal path 430 comprises the vector modulator 700, a functional block of which is shown in FIG. 8. However, a more detailed description of the vector modulator 700 will be given in the context of FIG. 9. The vector modulator 700 is controlled by two control signals typically labelled "I" and "Q" controlling the I-component and the Q-component of the signal provided to the vector modulator 700, respectively. By carefully controlling the I-signal and the Q-signal, it is possible to control the phase shift p2 as well as an amplitude of the signal generated by the vector modulator 700. As a consequence a phase-shifted and amplitude-corrected output signal of the vector modulator 700 (phase-shifted signal PSS in FIG. 6) can then be added to the delayed signal (time-delayed signal TDS in FIG. 6) from the first signal path 420. At the summing point, for instance implemented as the power coupler 460 in the embodiment depicted in FIG. 8, some portions of the delayed and the phase-shifted signals will cancel out, while others may add, forming an overall notch response.

Before describing the principles of operation of such a self-cancellation filter 400 in more detail, a brief overview of a vector modulator 700 will be given in view of FIG. 9. The vector modulator 700 depicted in FIG. 9 is a vector modulator 700 capable of processing both, single-ended and differential signals. As a consequence, the signal ports each have a positive (P; plus) and a negative (M; minus) counterpart to which a differential signal may be applied. The last characters of the port or terminal designation indicate their respective polarities. In the case of a single-ended signal, one of the ports may be coupled to a reference potential such as ground.

The vector modulator 700 generates a 90° phase offset version of the input signal, which is also referred to as the quadrature signal or Q-signal. The original signal—also referred to as in-phase signal or I-signal—and the 90° offset version of the signal are then coupled to two multipliers, which are externally controlled by control signals referred to as "I" (in-phase; I-control signal) and "Q" (quadrature; Q-control signal) in FIG. 9 provided to each of the multipliers. The results of the multiplications are then added together to form the output of the vector modulator 700. Vector modulators 700 are well-known devices, which are typically used to modulate a carrier signal with dynamic data (I, Q). In the application here, the I- and Q-control signals are, however, kept constant for a specific notch frequency such that a constant phase shift and amplitude correction is achieved.

Figure 9:
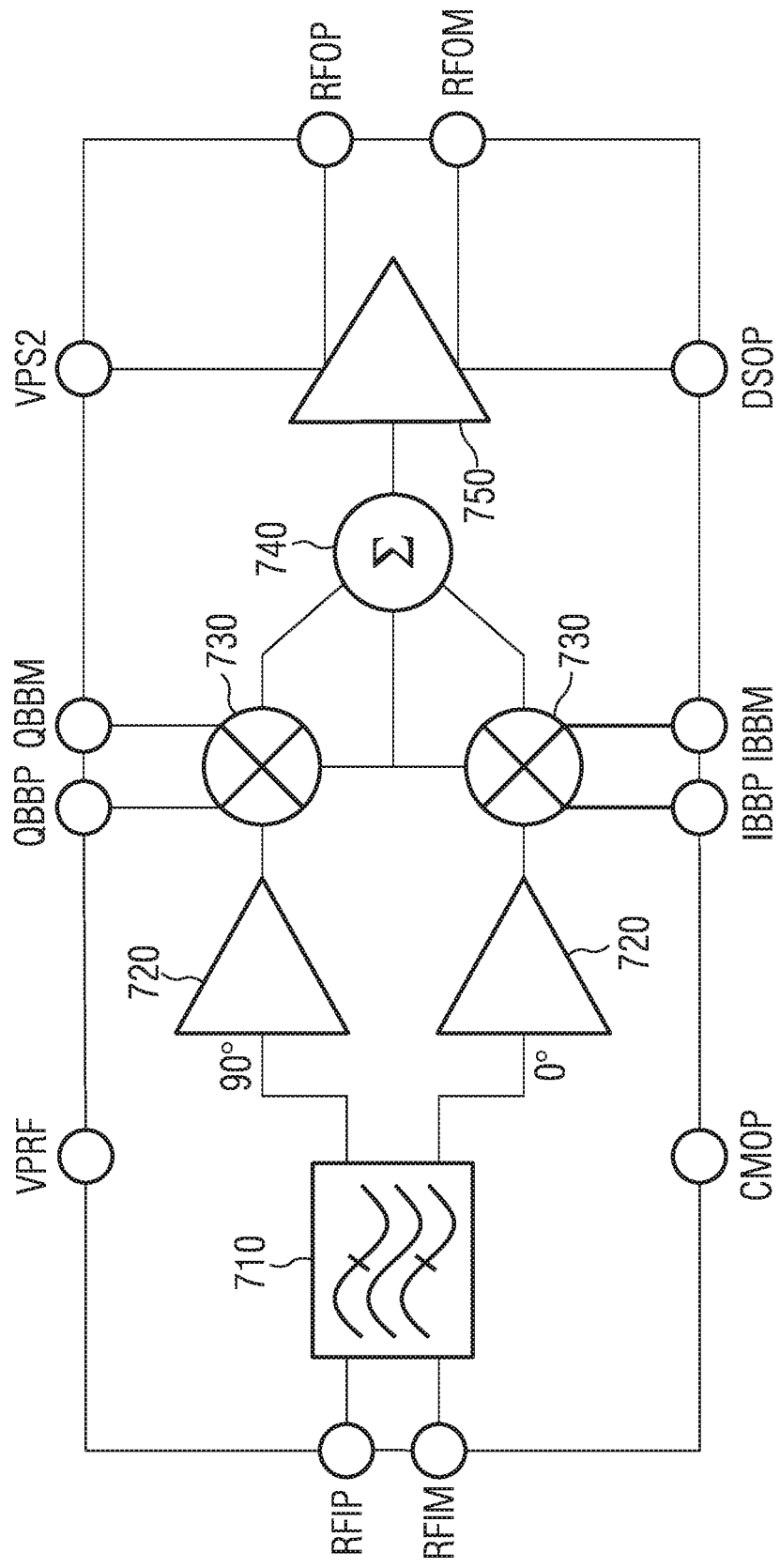
FIG. 9 shows a block diagram of a vector multiplier.

To be a little more precise, the vector modulator 700 depicted in FIG. 9 comprises two ports for a radio-frequency input signal RFIP, RFIM (RF=radio frequency; I=input; P=plus; M=minus), which are coupled to a splitter circuit 710, which is specifically designed and configured to generate an in-phase signal I (0°) and a quadrature signal Q (90°). Each of the signals is then provided to an optional amplifier 720 before being fed to a controllable multiplier 730 for each of the signals. The multiplier 730 may be controlled by corresponding low frequency or baseband control signals which are referred to as IBBP, IBBM (I=in-phase component; BB=baseband; P=plus; M=minus) for the in-phase component and QBBP and QBBM (Q=quadrature component; BB=baseband; P=plus; M=minus) for the quadrature signal, respectively. The multiplied in-phase signal and multiplied quadrature signal are then added by an adder 740 before being provided to an optional amplifier 750 before being provided to corresponding radio-frequency output ports RFOP, RFOM (RF=radio frequency; O=output; P=plus; M=minus), respectively.

As indicated earlier, the mentioned ports of the vector modulator 700 are designed for differential signals such that the last letter of each of the labels is either "P" (plus) for the positive signal component or "M" (minus) for the negative component.

FIG. 9 further shows two ports referred to as VPRS and VPS2, which are used for the power supply of a vector modulator 700. The port CMOP refers to a port to which a reference potential can be coupled. The port DSOP coupled to the optional amplifier 750 can be used to disable the outputs RFOP, RFOM of the vector modulator 700.

Returning to the principles of operation of the self-cancellation filter 400, in the case of a single continuous sinewave signal with a frequency f at the input, the continuous sinewave signal is split into the first and second signals and provided to the first signal path 420 and the second signal path 430. In the first signal path 420 the sinewave is delayed by an amount d1. In the second signal path 430 the phase of the sinewave can be controllably adjusted. For a single sinewave it is possible to translate the delay d1 into an equivalent phase p1. It is therefore possible to determine one particular set of values for the I- and Q-control signals, which performs a turn of the phase of the input signal by 180° (or π) so that the cancellation with the original signal can take place and to adjust the phase of the input signal by an additional amount to compensate for the time delay d1, which is caused in the first signal path 420.

If controlled correctly, the delayed sinewave from the first signal path 420 will be added to an inverted sinewave passing through the second signal path 430. The sinewaves will cancel. This will be the center of the notch.

The I- and Q-control signals will, however, only cancel the continuous sinewave of frequency f completely. For sinewaves slightly above or below the frequency f, the phase shift will still be essentially the same as it was for the signal at the frequency f. However, the time delay between the two signal paths 420, 430 will cause the signals to arrive at the coupler 440 representing the summing node at slightly different times, thus not canceling perfectly anymore. The further away from the frequency is from the notch frequency f, the lesser the cancellation effect is. As a result, an overall notch response is formed with a notch frequency f. For multiples of the frequency f, a point of cancellation reappears, turning the broadband response into the one of a comb filter.

To control the notch response of a self-cancellation filter 400, two aspects of the I- and Q-control signals can be controlled. First of all, the center of the notch can be placed arbitrarily by choosing the ratio between I- and Q-control signals such that they introduce a phase shift of 180° and compensate for the delay difference between the two signal paths 420, 430. Moreover, the magnitude of the I- and Q-control signals may be chosen so that the amplitude of the phase-corrected signal matches the one of the delayed signal as described before.

The I- and Q-control signals may be derived in an analog fashion by using one or more DACs 500 as depicted in FIG. 6. Their values can be controlled by a software or program running on the corresponding processing unit 510. Thus, the notch response can be software defined. The self-cancellation filter 400 may therefore be able to be operated as a highly dynamic analog filter under software control.

Figure 10:
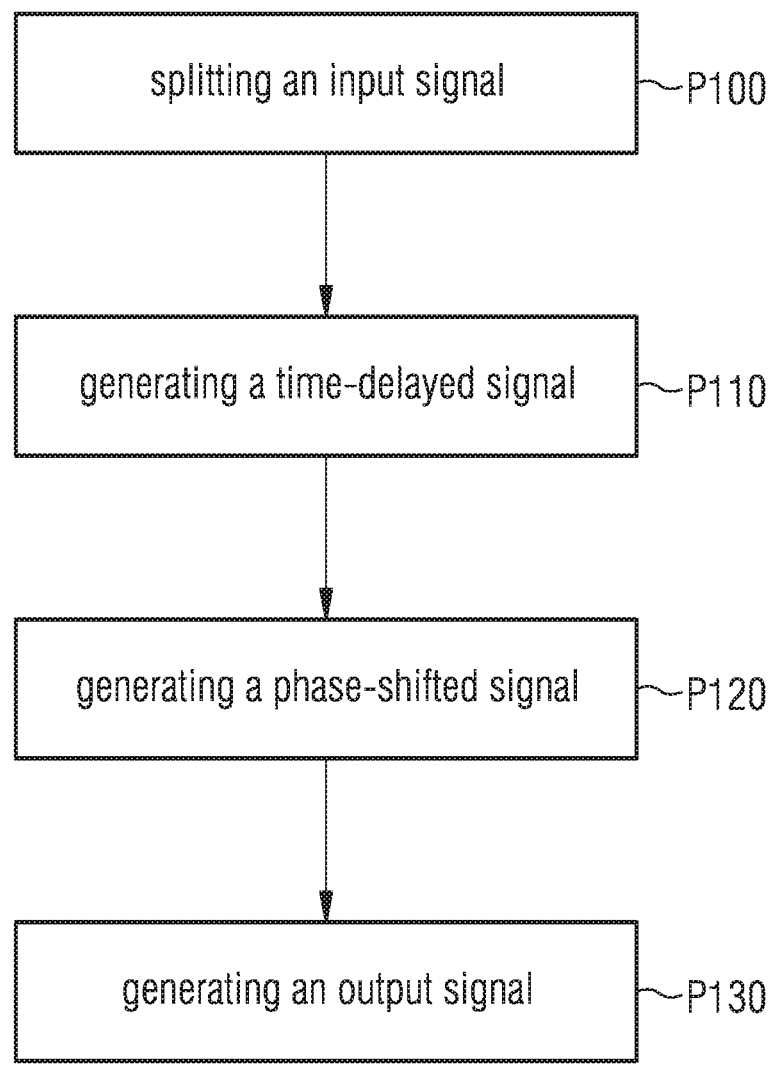
FIG. 10 shows a flowchart of a method according to an embodiment.

FIG. 10 shows a flowchart of a method for filtering an analog radio-frequency input signal IS. In a first process P100, the input signal IS is split into at least a first signal S1 and a second signal S2 as described before. In a process P110 a time-delayed signal delayed by a predetermined delay time in the time domain is generated based on the first signal. In a process P120, based on the second signal S2, a phase-shifted signal PSS shifted by a controllable predetermined phase shift in the phase domain is generated. In a process P130 the output signal OS is generated based on the time-delayed signal TDS and the phase-shifted signal PSS.

Optionally, the method may further comprise determining the phase shift as described above.

Although in the flowchart of FIG. 10 the processes are shown in a sequence connected by arrows, the individual processes are by far not required to be performed in the order given in FIG. 10. The order of the processes may be changed. Furthermore, the processes may occur at least partially or completely simultaneously as described above. Moreover, the processes are by far not required to be performed only once but may be operated continuously until, for instance, the corresponding processes are interrupted or terminated.

Figure 11:
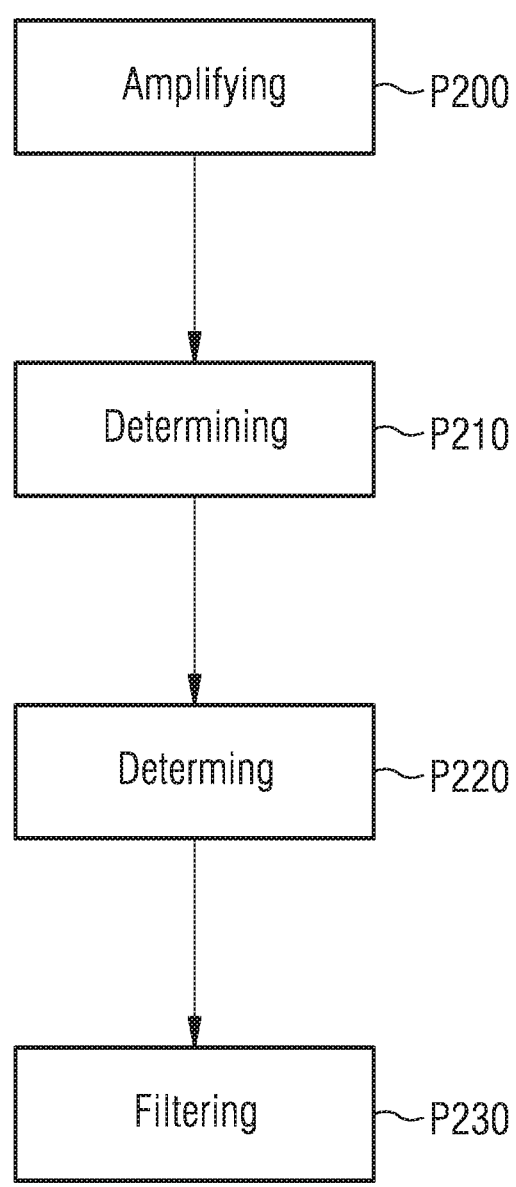
FIG. 11 shows a flowchart of another method according to an embodiment.

FIG. 11 shows a flowchart of another method according to an embodiment. The method for a receiver system 600 comprises amplifying P200 a receive signal and determining P210 an unwanted signal component in the amplified signal. The method further comprises determining P220 a delay time and a phase shift based on the unwanted signal component, and filtering P230 the amplified signal according to the above method using the delay time as predetermined delay time and using the phase shift as predetermined phase shift.

By using an embodiment it may be possible to avoid fixed frequency band filters, to detect the presence of a blocking signal and to use the concept of self-cancellation filtering to target blocking signals. It may be possible to mix down and digitize the remaining spectrum in the case of a digital implementation. Moreover, unwanted spectrum components may be removed by using a reprogrammable digital filter operating in the digital domain. Using an embodiment may improve a trade-off between frequency-related flexibility and frequency agility of a receiver infrastructure.

Figure 12:
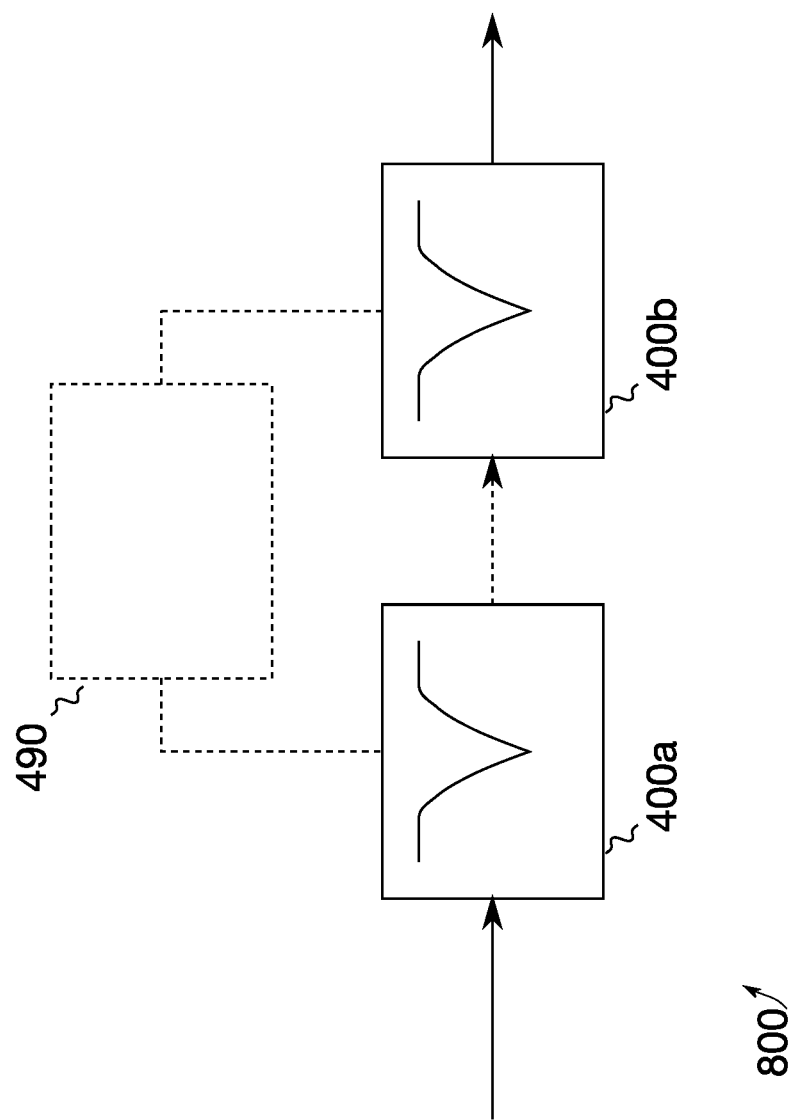
FIG. 12 illustrates an embodiment of a cascade of multiple filters.

As described above, in some embodiments cascades of multiple filters 400 may be used, e.g. two or more filters coupled in series or in parallel or both. The above described filtering method may then be repeated in a cascade. Embodiments hence also provide a method for filtering an analog radio-frequency input signal (IS) repeated in a cascade. FIG. 12 illustrates an embodiment of a cascade 800 of multiple filters, represented by filters 400a and 400b. The multiple filters 400a and 440b are coupled in series in the depicted embodiment and there could potentially be further filters in between, indicated by the dotted arrow coupling the output of filter 400a with the input of filter 400b. As further shown as optional component in FIG. 12, a control circuit 490 (potentially comprising one or more processing units) may provide control signals to multiple filters 400a, 400b. In other words, a common or coordinated control of the filters 400a and 400b of the cascade may be carried out. Therewith, an overall frequency response or impulse response of the cascade 800 can be formed using the individual filter characteristics.

In some embodiments the control circuit 490 is configured to control the multiple filters 400, 400a, 400b. The multiple filters 400, 400a, 400b may have different notch frequencies complementing to a frequency response of the cascade 800. A self-cancellation filter 400 as described above can be used to build a highly flexible, frequency agile RF front-end to complement the agility of a modern RF receiver/transceiver. Modern RF receivers/transceivers may use LOs with a very wide tuning range. In some embodiments the LO frequency can be software programmed to reside anywhere between 60 MHz and 6 GHz with very high accuracy. Future developments may allow for even wider tuning ranges. At the same time the maximum bandwidth of the demodulated signal may also increase from 57 MHz to well over 200 MHz and beyond. Thirdly, modern receivers/transceivers may also feature a very high dynamic range: Being able to support large incoming signal amplitudes and digitize them with a very high number of digital bits.

To turn such a highly flexible receiver/transceiver into a highly flexible RF module, the receiver/transceiver may be connected to an antenna using a highly flexible analog RF network. An embodiment of the self-canceller (filter 400, 400a, 400b) as described above can be used to build a frequency agile, software programmable RF filter 400, a cascade 800 of multiple such filters, respectively.

One of the main aims of the RF filter 400, 800 in the receive path is to ensure adequate suppression of unwanted RF components of high amplitude. Such signals are typically referred to as "blockers" as they may block the receive path of an RF front-end completely. In such worst case, a blocker from a nearby source may have a very high signal power and may occupy a bandwidth very close to the wanted signal. Without adequate suppression via an RF front-end filter (channel selection filter), the receiving RF module has two choices:

It may adjust its internal front-end gain in a way to allow the blocking signal to enter the RF path, be processed without clipping and be digitized. Since the blocker's power may be high, the overall gain setting may be low (e.g. automatic gain setting). This is very likely to render the nearby, wanted signal so small in amplitude that successful digital demodulation is no longer possible. With other words: The digital number range is fully occupied by the large blocking signal and only an inadequate number of bits (=dynamic range) is available for the wanted signal.

The front-end gain may be set (fixed) in a way to support the small amplitude of the wanted signal, amplifying it to fill the analog input range of the receiver/transceiver. If no blocker was present, this would be a good or even ideal operational point to allow retrieval and successful demodulation of the wanted signal. In cases with large blocking signals however, the relatively high gain setting will cause the blocker to overflow the analog input signal range as well as the input range of the ADC causing massive distortion to both, the analog signal path as well as the ADC conversion. The resulting digital number stream does contain the wanted signal, but the added distortion caused by the overflowing blocker may make demodulation practically impossible.

To avoid the described scenario, conventional RF front-end filters have a band-pass characteristic and are designed to allow the wanted signal to pass while removing or reducing potentially all other signal components. Present or not, any unwanted signals of large or small amplitudes are attenuated sufficiently to prevent overflowing of the RF signal path. While this is a very effective way to ensure proper reception of the wanted signal, it comes at the cost of inflexibility. Said band-pass filters (or high pass filters or low pass filters or combinations thereof) are typically constructed in such a way that their spectral characteristics depend on electrical components with a widely fixed behavior. This makes those filters very inflexible. Some techniques exist to allow some limited adjustment to said filters. These include components such as pin diodes or tunable capacitors which can be used to allow a somewhat limited degree of adjustability of the final spectral response of the filter.

Another way to make said RF front end filters more frequency agile is to assemble an array of fixed frequency filters and allow them to be selected using dynamic switching. This technique allows merely choosing from a set of pre-defined filters. Each filter itself however is fixed in response. It should be noted that RF front-end filters typically have a band pass characteristic. They allow the band-of-interest to pass while suppressing the spectrum above and below regardless whether blocking signals are present there or not.

The self-cancellers (filters 400, 400a, 400b) described herein show a notch response that can be placed at nearly arbitrary positions using the control signal. The available spectral tuning range of the self-canceller may be wider and more flexible than the adjustability of other filter tuning techniques. Practical usage of a single self-canceller filter 400 can be limited due to the reasonably narrow notch response. Said notch could be adequate to suppress a narrow band blocking signal (single tone). Most blocking signals are however likely to occupy a spectral range exceeding the width of the notch of a typical canceller, which can be addressed using a cascade 800. At the same time, notch filters 400, 400a, 400b can be particularly useful in filtering scenarios due to their steepness. They allow a "surgical approach" to filtering by "assembling" a desired frequency response of the cascade 800 with multiple filters 400, 400a, 400b, which can be flexibly changed through a software controlled control signal in some embodiments. As shown in FIG. 12 a series of two or more filters 400a, 400b may be a basic setup of a composite frequency response of the cascade 800. In further embodiments further parallel branches with filters 400 may be added, bypass switches for some or all of the filters 400, respectively. Therewith an even higher flexibility can be achieved at least in some embodiments.

Possible implementations of said bypass switches include, but are not limited to, transistor based switches (pass gate architecture) based on Complementary Metal-Oxide-Semiconductor (CMOS), Gallium-Arsenide (GaAS) or other technologies or switches based on MEMS technology.

Figure 13:
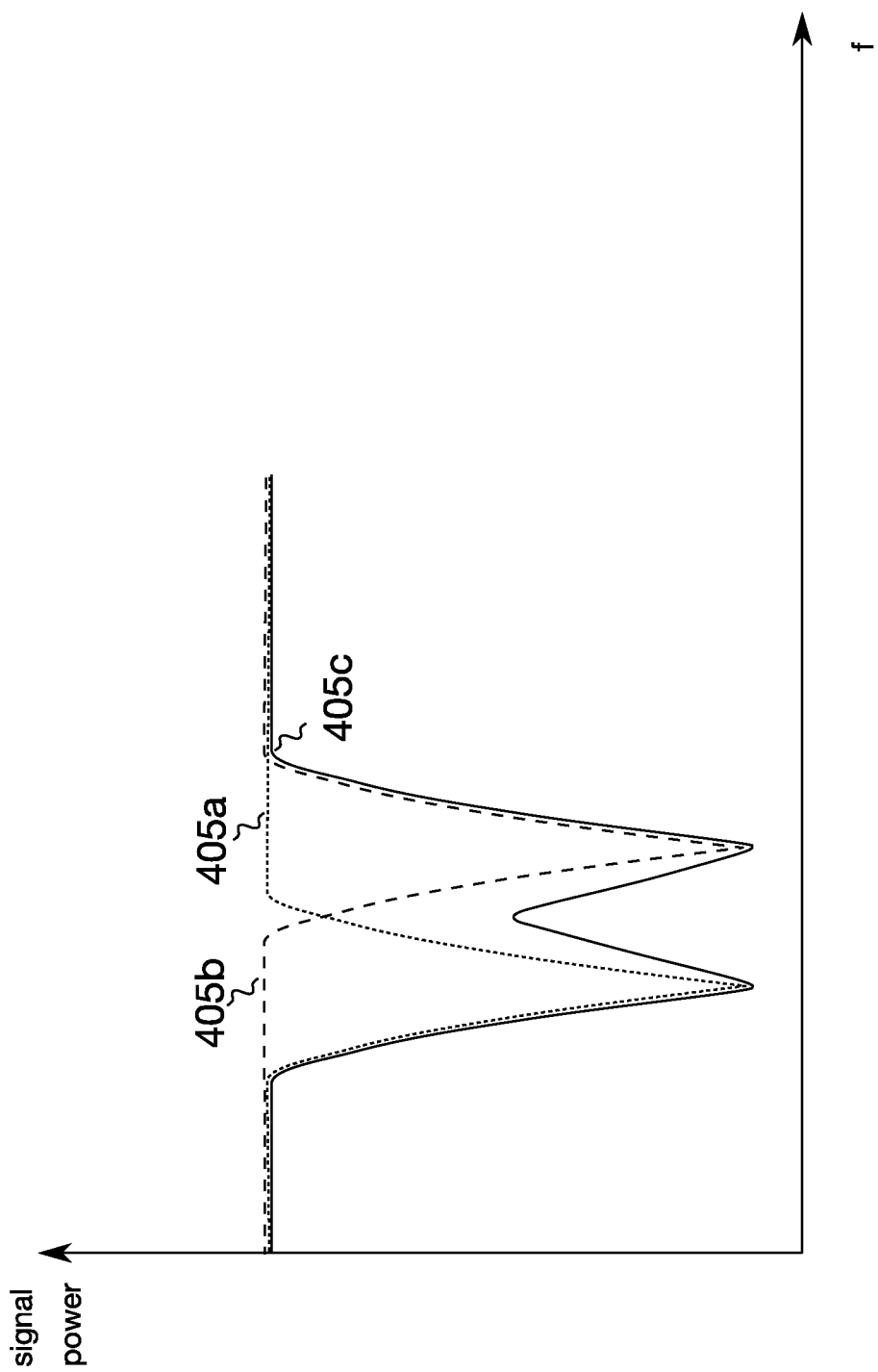
FIG. 13 shows a frequency response of an embodiment of a cascade of two filters.
Figure 14:
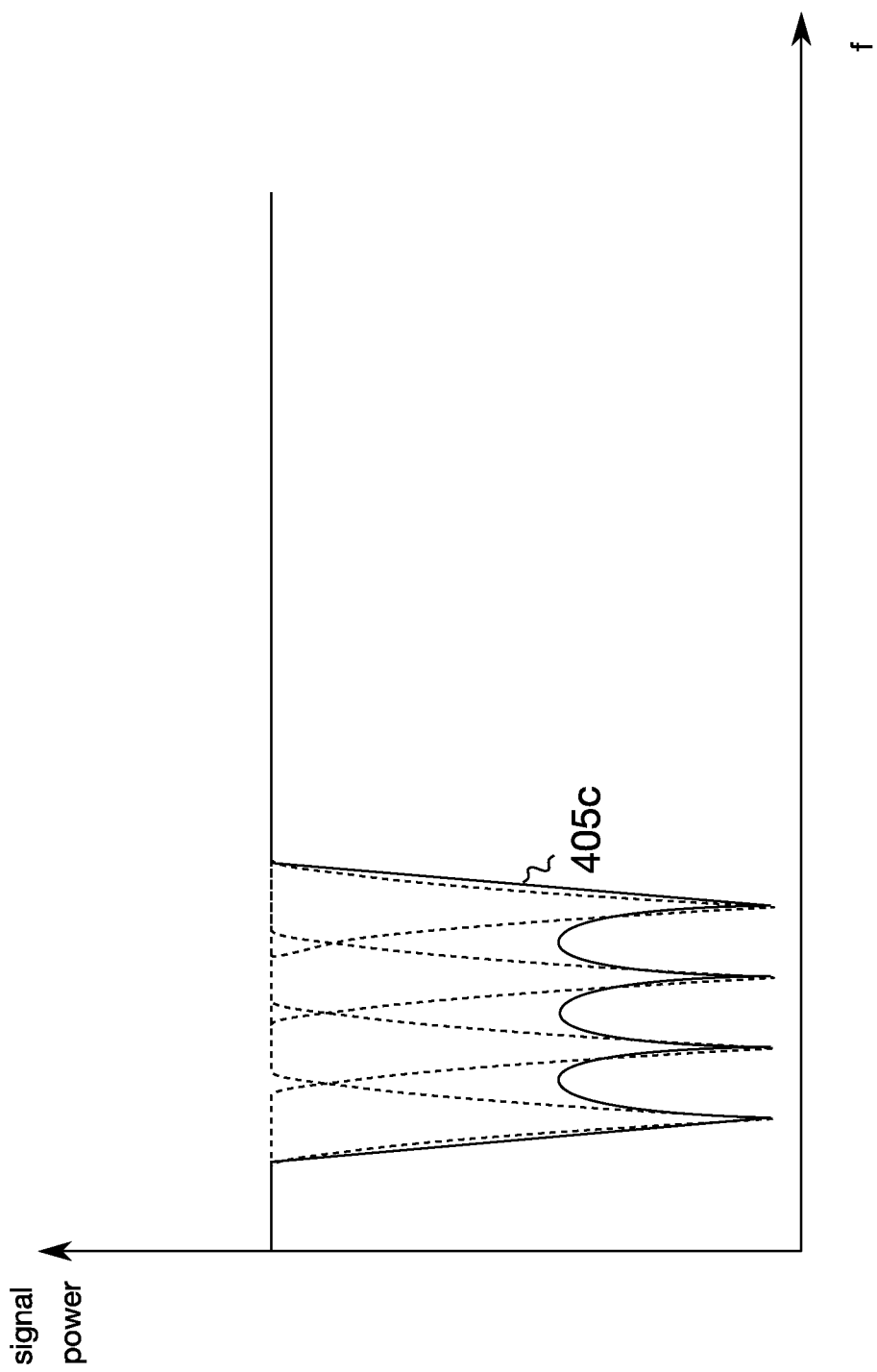
FIG. 14 shows another frequency response of an embodiment of a cascade with a plurality of filters complementing a band-stop characteristic.
Figure 15:
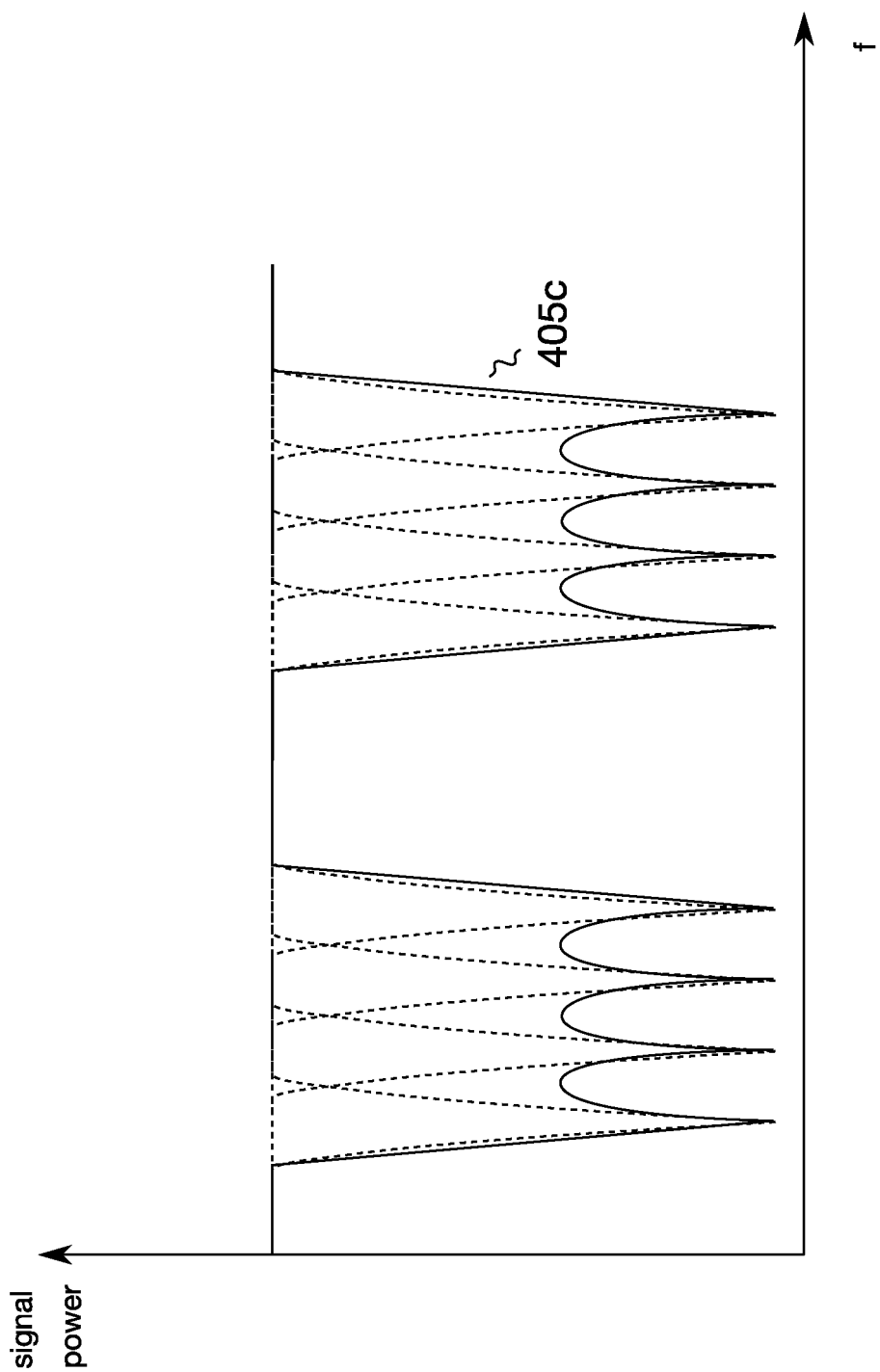
FIG. 15 shows another frequency response of an embodiment of a cascade with a plurality of filters complementing a bandpass characteristic.

Notch filters 400a, 400b may be cascaded (e.g. combined in series) to overlay their single responses. This way, wider notches may be constructed as shown in FIGS. 13, 14 and 15. The following FIGS. illustrate frequency responses in a spectral representation having frequency (f) on the abscissae and normalized signal (output) power on the ordinate. FIG. 13 shows a frequency response of an embodiment of a cascade 800 of two filters 400a, 400b as depicted in FIG. 12. The two individual frequency responses 405a, 405b (of filters 400a (dotted line), 400b (broken line)) are overlaid resulting in the frequency response 405c (solid line) of the cascade 800. As can be seen the two notch characteristics 405a and 405b add up to a band-stop characteristic, which can be formed using the positions of the two notches (potentially any number of notches). FIG. 14 shows another frequency response 405c of an embodiment of a cascade 800 with a plurality of filters complementing a band-stop characteristic. By placing basically any number of notch characteristics next to each other the width of the stopband can be adjusted.

FIG. 15 shows another frequency response 405c of an embodiment of a cascade 800 with a plurality of filters 400 complementing a bandpass characteristic. For example, two band-stop characteristics as described in FIG. 14 can be placed next to each other with the desired passband in between. As indicated by these Figs. the different notch frequencies complement each other to a band-stop or a bandpass characteristic of the cascade 800 in some embodiments. In embodiments the control circuit 490 can be configured to adapt the different notch frequencies based on an interference characteristic in the input signal (IS).

Increasing the total number of notches N (any integer) and carefully placing their respective center frequencies close to each other, a band stop response can be constructed. Using the already described self-canceller 400 allows dynamic configuration of said notches in a very flexible way. Therefore, frequency agile band stop filters can be built using an array of notches (cascade 800) made from self-cancellers 400.

In embodiments placing notches further apart may increase (widen) the stop band. At the same time, the overall suppression of the filter decreases (stopband suppression is reduced).

In some embodiments the number of notches may be adaptive, too. For example, this could be achieved by using software controlled bypass switches to activate any number of notches between 0 and a maximum (total number of filters 400 available). Further notches may be activated if further suppression at a certain spectral position is desired. Moving notches closer to each other may improve the stop band attenuation but may decrease the width of the overall stop band (in such a case further notches could be activated to improve the width, the attenuation, respectively). Increasing the number of notches (to allow more notches to be placed close to each other) may increase the overall cost of the structure and may increase a passband attenuation.

Typical RF front-end filters may exhibit band pass responses, allowing a wanted signal to pass and suppressing all signals outside the band of interest. They lack wide range adjustability, which can be overcome in embodiments.

Embodiments of cascades 800 may comprise self-cancellers, which are frequency agile. They exhibit a notch response which can be used to selectively cut out small portions of a spectrum. Several notch filters 400, 400a, 400b may be combined to form a band stop response.

Figure 16:
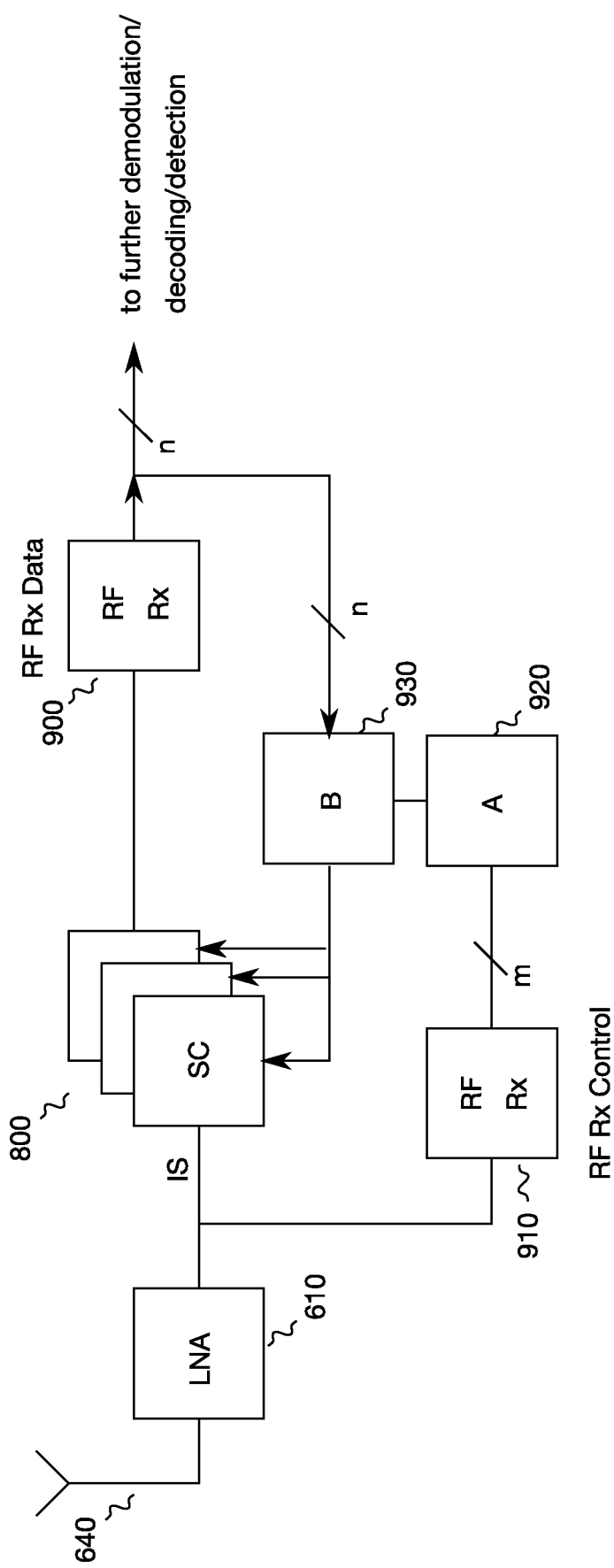
FIG. 16 shows an embodiment of a receiver circuit with a controllable or adaptive embodiment of a filter cascade.

FIG. 16 shows an embodiment of a receiver circuit or system 600 with a controllable or adaptive embodiment of a filter cascade 800. The receiver system 600 comprises a frequency agile RF front-end filter 800. The signal from a receive antenna 640 is fed to a wide band LNA 610. A very coarse band pass filter may be incorporated into the LNA 610 to ensure it can amplify the signal from the antenna 640 without distortion.

Two signal paths exist thereafter: The output of the LNA 610 feeds a cascade 800 of self-cancellers (SC) which may filter the signal depending on the setting of their corresponding control values. The filtered signal is then fed to an RF receiver or transceiver "RF RX" 900 in the data path, where the signal is demodulated and its digital data bus "n" is fed to further demodulation, decoding or detection. This constitutes the main RF data path. The amplified signal from the LNA 610 is also fed to a second RF receiver/transceiver "RF RX" 910 in a control path, the purpose of which is generate or prepare the generation of the control signals or values for the filters 400 in the cascade 800.

The RX-control receiver/transceiver 910 sets its gain to suit the largest input signal (highest amplitude/power) without clipping it. The digitized output from the RX-control 910 is fed into a digital processing block A 920, which may correspond to one or more control circuits 490, 625 for the filters 400 as described above. For example, block A 920 may be implemented using one or more processors, Digital Signal Processors (DSPs), any programmable hardware components, etc. This block 920 contains an algorithm suitable to identify the amplitude and frequency of the largest (with the highest amplitude/power) spectral component contained in the signal from the LNA 610. This algorithm may for instance be based on a Fast Fourier Transformation (FFT) algorithm. The information about the frequency and amplitude of the largest signal as detected by RX-Control 910 and determined by processing block A 920 is then fed to another control block B 930, which may also be implemented in a similar manner as control block A, using the same processing capacities, respectively. For example, control block B 930 may be implemented in a software module being executed on the same hardware as the software module implementing block A 920.

Control block B 930 uses the parameters about the largest signal component as determined by processing block A 920 to determine whether the signal described by the parameters determined by processing block A is an unwanted signal. In case it is an unwanted signal it calculates appropriate I/Q values for the cascade 800 of self-cancellers SC in such a way that their corresponding notches are placed in a manner as to suppress the unwanted signal.

If set correctly, the cascade 800 of self-cancellers will take out the unwanted large amplitude signal as identified by control block B 930. Therefore at the output of the cascade 800 of self-cancellers this unwanted large amplitude signal will be attenuated enough to allow the main RF data path receiver/transceiver "RF Rx Data" 900 to demodulate and process the wanted signal.

The described feed-forward path {"RF RX Control" 910→"A" 920→"B" 930} may be complemented by a closed loop path {"SC"800→"RF RX Data" 900→"B" 930} to enable fine tuning of the self-cancellers 400 of the cascade 800 by minimizing the signal power received outside the bandwidth occupied by the wanted signal. The output of "RF RX Data" 900 may be fed to a digital band pass filter designed to fully suppress any residual components of an unwanted signal from the data path before entering any final demodulation/decoding/detection blocks.

Conventional channel filtering can be based on the concept of suppressing all unwanted bands whether there is an offending blocker or not. The embodiments shown here are based on the concept of finding offending signals first and to then take them out by placing notches at (ideally exactly) the right position. The number of self-cancellers can be increased to match the maximum number of blockers expected and/or their respective overall band width. The control units 490, 625, 920, 930 etc. as described herein can be software controlled. As described above, in embodiments a receiver system 600 may comprise a search component, for example, implemented in a control path 910, 920, 930 in FIG. 16. The search component, e.g. control block A 920, may be configured to determine the predetermined unwanted signal component. Such a receive system can be configured to adaptively track and reduce a narrow band interference signal in the input signal (IS).

The aspects and features mentioned and described together with one or more of the previously detailed examples and figures, may as well be combined with one or more of the other examples in order to replace a like feature of the other example or in order to additionally introduce the feature to the other embodiments.

Examples may further comprise a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. It will thus be appreciated that those skilled in the art will be able to devise various arrangements that, although not explicitly described or shown herein, embody the principles of the disclosure and are included within its spirit and scope.

Functions of various elements shown in the figures may be implemented in the form of dedicated hardware, such as "a signal generator", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

Multiple acts, processes, operations, steps or functions disclosed in the specification or claims do not have to be executed in the specific order described, unless explicitly or implicitly stated otherwise, for instance for technical reasons. Therefore, the disclosure of multiple processes does not limit these to a particular order unless such processes are not interchangeable for technical reasons. Furthermore, in some examples a single process may be broken into multiple sub-processes. Such sub-processes may be included and be part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other example examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

LIST OF REFERENCE SIGNS 100 receiver system
110 antenna
120 low noise amplifier
130 bandpass filter
140 receiver circuit
200 hypothetical receiver system
210 antenna
220 low noise amplifier
230 receiver circuit
240 digital filter
250 bandpass filter
300 wanted RF signal
310 blocker
320 input range of ADC
330 filter characteristic
400, 400a, 400b filter
405a, 405b, 405c filter characteristic
410 splitter
420 first signal path
430 second signal path
440 coupler
450 power splitter
460 power coupler 470 delay element
480 phase-shift circuit
490 control circuit
500 DAC
510 processing circuit
600 receiver system
610 amplifier
620 receiver circuit
625 control unit
630 terminal
640 antenna
700 vector modulator
710 splitter circuit
720 amplifier
730 multiplier
740 adder
750 amplifier
800 cascade
900 RF receiver data path
910 RF receiver control path
920 Control block A
930 Control block B
P100 splitting an input signal
P110 generating a time-delayed signal
P120 generating a phase-shifted signal
P130 generating an output signal
P200 amplifying a receive signal
P210 determining an unwanted signal component
P220 determining a delay time and a phase shift
P230 filtering the amplified signal
IS input signal
S1 first signal
S2 second signal
TDS time delayed signal
PSS phase shifted signal
OS output signal
CS control signal

What is claimed is:

1. A cascade comprising multiple filters, a filter comprising:
    a splitter configured to split an analog radio-frequency input signal into at least a first signal and a second signal;
    a first signal path configured to generate, based on the first signal, a time-delayed signal delayed by a predetermined delay time in the time domain;
    a second signal path configured to generate, based on the second signal, a phase-shifted signal shifted by a controllable predetermined phase shift in the phase domain,
        wherein the second signal path comprises a controllable phase-shifter circuit configured to shift the phase of the second signal or a signal derived from the second signal by the predetermined phase shift in the phase domain to generate the phase-shifted signal,
        wherein the phase-shifter circuit is configured to generate the phase-shifted signal with the phase shift being controllable by at least one control signal; and
    a coupler configured to generate an output signal based on the time-delayed signal and the phase-shifted signal,
        wherein the cascade comprises a control circuit configured to generate the at least one control signal for each filter of the multiple filters in the cascade.

2. The cascade according to claim 1, wherein the phase-shifter circuit is further configured to generate the phase-shifted signal with an amplitude being controllable by the at least one control signal, wherein the at least one control signal is generated such that the phase shift and the time delay correspond to a predetermined notch frequency of the filter causing the time-delayed signal and the phase-shifted signal to at least partially destructively interfere at the notch frequency.

3. The cascade according to claim 2, wherein the delay element comprises at least one of a transmission line, an active circuit configured to delay the first signal or a signal derived from the first signal by the predetermined delay time in the time domain and a passive circuit configured to delay the first signal or the signal derived from the first signal by the predetermined delay time in the time domain.

4. The cascade according to claim 2, wherein the control circuit is configured to control the multiple filters, wherein the multiple filters have different notch frequencies complementing to a frequency response of the cascade.

5. The cascade according to claim 4, wherein the different notch frequencies complement each other to a band-stop or a bandpass characteristic of the cascade.

6. The cascade according to claim 4, wherein the control circuit is configured to adapt the different notch frequencies based on an interference characteristic in the input signal.

7. The cascade according to claim 1, wherein the first signal path comprises a delay element configured to delay the first signal or a signal derived from the first signal by the predetermined delay time in the time domain to generate the time-delayed signal and wherein the delay element is configured to generate the time-delayed signal with the delay time being essentially constant over a payload frequency range of the input signal.

8. The cascade according to claim 1, wherein the splitter comprises a power splitter or a 3 dB-power splitter, and wherein the coupler comprises a power coupler, and/or wherein the input signal comprises at least one of a plurality of frequencies and a finite frequency range.

9. A receiver system comprising a low noise amplifier, which is coupled to an input of a cascade according to claim 1, a radio frequency receiver circuit, which is coupled to an output of the cascade, and a control unit configured to control the multiple filters, wherein a predetermined unwanted signal component is reduced at the output of the cascade.

10. The receiver system according to claim 9, wherein the control unit is software controlled.

11. The receiver system according to claim 9, further comprising a search component, the search component being configured to determine the predetermined unwanted signal component.

12. The receiver system according to claim 9, being configured to adaptively track and reduce a narrow band interference signal in the input signal.

13. A method for filtering an analog radio-frequency input signal repeated in a cascade, the method comprising:
    splitting the input signal into at least a first signal and a second signal;
    generating, based on the first signal, a time-delayed signal delayed by a predetermined delay time in the time domain;
    determining a controllable phase shift for each repetition in the cascade,
    generating, based on the second signal, a phase-shifted signal shifted by the controllable phase shift in the phase domain; and
    generating an output signal based on the time-delayed signal and the phase-shifted signal, repeating the method for filtering wherein the output signal of one repetition is provided as the input signal for the next repetition in the cascade.

14. A method for a receiver system comprising, amplifying a receive signal;

determining an unwanted signal component in the amplified signal;

determining a delay time and a phase shift based on the unwanted signal component; and filtering the amplified signal according to the method of claim 13 using the delay time as predetermined delay time and using the phase shift as predetermined phase shift.

\* \* \* \* \*